United States Patent
Zheng et al.

(10) Patent No.: US 12,050,882 B2
(45) Date of Patent: Jul. 30, 2024

(54) FUSED ACOUSTIC AND TEXT ENCODING FOR MULTIMODAL BILINGUAL PRETRAINING AND SPEECH TRANSLATION

(71) Applicant: Baidu USA, LLC, Sunnyvale, CA (US)

(72) Inventors: Renjie Zheng, San Jose, CA (US); Junkun Chen, Corvallis, OR (US); Mingbo Ma, Milpitas, CA (US); Liang Huang, Mountain View, CA (US)

(73) Assignee: Baidu USA LLC, Sunnyvale, CA (US)

( * ) Notice: Subject to any disclaimer, the term of this patent is extended or adjusted under 35 U.S.C. 154(b) by 398 days.

(21) Appl. No.: 17/533,687

(22) Filed: Nov. 23, 2021

(65) Prior Publication Data

US 2023/0169281 A1   Jun. 1, 2023

(51) Int. Cl.
*G06F 40/58* (2020.01)
*G10L 15/06* (2013.01)
*G10L 15/28* (2013.01)

(52) U.S. Cl.
CPC ............ *G06F 40/58* (2020.01); *G10L 15/063* (2013.01); *G10L 15/28* (2013.01)

(58) Field of Classification Search
CPC .......... G06N 3/045; G06N 20/00; G06N 3/08; G06N 3/0455; G10L 15/16; G10L 25/30; G10L 15/063; G10L 15/28; G06F 40/58; G06F 2207/4824; G06F 40/26; G06F 40/40

See application file for complete search history.

(56) References Cited

U.S. PATENT DOCUMENTS 10,540,585 B2 *  1/2020  Norouzi .................. G06N 3/044
10,573,312 B1 *  2/2020  Thomson ................ G10L 15/22
(Continued)

OTHER PUBLICATIONS

Y. Jia et al., "Leveraging weakly supervised data to improve end-to-end speechto-text translation," arXiv preprint arXiv:1811. 02050, 2019. (5pgs).

(Continued)

*Primary Examiner* — Jakieda R Jackson
(74) *Attorney, Agent, or Firm* — NORTH WEBER & BAUGH LLP

(57) ABSTRACT

Representation learning for text and speech has improved many language-related tasks. However, existing methods only learn from one input modality, while a unified representation for both speech and text is needed for tasks such as end-to-end speech translation. Consequently, these methods cannot exploit various large-scale text and speech data and their performance is limited by the scarcity of parallel speech translation data. To address these problems, embodiments of a fused acoustic and text masked language model (FAT-MLM) are disclosed. FAT-MLM embodiments jointly learn a unified representation for both acoustic and text input from various types of corpora including parallel data for speech recognition and machine translation, and pure speech and text data. Within this cross-modal representation learning framework, an end-to-end model is further presented for fused acoustic and text speech translation. Experiments show that by fine-tuning from FAT-MLM, the speech translation model embodiments substantially improve translation quality.

20 Claims, 17 Drawing Sheets

(56) References Cited

U.S. PATENT DOCUMENTS

| | | | | |
|---|---|---|---|---|
| 11,170,448 | B2* | 11/2021 | Kim | G06F 16/313 |
| 11,836,467 | B2* | 12/2023 | Allamanis | G06F 8/33 |
| 2020/0175961 | A1* | 6/2020 | Thomson | G10L 15/28 |
| 2020/0364543 | A1* | 11/2020 | Luong | G06N 3/045 |
| 2020/0410344 | A1* | 12/2020 | Kaiser | G06N 3/084 |
| 2021/0304769 | A1* | 9/2021 | Ye | G10L 15/16 |
| 2021/0319314 | A1* | 10/2021 | Perez | G06N 3/044 |
| 2021/0342377 | A1* | 11/2021 | Galle | G06N 3/045 |
| 2021/0357282 | A1* | 11/2021 | Verma | G06N 3/044 |

OTHER PUBLICATIONS

J. Kahn et al., "Libri-Light: a Benchmark for ASR With Limited or no Supervision," arXiv preprint arXiv:1912.07875, 2019. (7pgs).

Kocabiyikoglu et al., "Augmenting librispeech with french translations: A multimodal corpus for direct speech translation evaluation," In Proceedings of the Eleventh International Conference on Language Resources and Evaluation (LREC 2018), 2018. (5pgs).

P. Koehn, "Europarl: A parallel corpus for statistical machine translation," In MT summit, vol. 5, pp. 79-86. Citeseer, 2005. (8 pgs).

T. Kudo et al., "SentencePiece: A simple and language independent subword tokenizer and detokenizer for neural text processing," arXiv preprint arXiv:1808.06226, 2018. (6pgs).

G. Lample et al., "Cross-lingual language model pretraining," arXiv preprint arXiv:1901.07291, 2019. (10pgs).

H. Le et al.,, "Dual-decoder transformer for joint automatic speech recognition and multilingual speech translation," arXiv preprint arXiv:2011.00747, 2020. (14pgs).

A. Liu et al., "TERA: Self-supervised learning of transformer encoder representation for speech," arXiv preprint arXiv:2007.06028, 2020. (14pgs).

Y. Liu et al., "Bridging the modality gap for speech-to-text translation," arXiv preprint arXiv:2010.14920, 2020. (11 pgs).

V. Panayotov et al., "Librispeech: an ASR Corpus Based on Public Domain Audio Books," In 2015 IEEE International Conference on Acoustics, Speech and Signal Processing (ICASSP), 2015. (5 pgs).

M. Peters et al., "Deep contextualized word representations," arXiv preprint arXiv:1802.05365, 2018. (15pgs).

J. Pino et al., "Self-Training for End-to-End Speech Translation," arXiv preprint arXiv: 2006.02490, 2020. (5pgs).

D. Povey et al., "The Kaldi Speech Recognition Toolkit," In IEEE 2011 workshop, 2011. (4pgs).

A. Radford et al.,"Improving Language Understanding by Generative Pre-Training," [online], [Retrieved Dec. 21, 2023]. Retrieved from Internet <URL: https://s3-us-west-2.amazonaws.com/openai-assets/research-covers/language-unsupervised/language_understanding_paper.pdf> 2018. (12pgs).

P. Rajpurkar et al., "SQUAD: 100,000+ Questions for Machine Comprehension of Text," arXiv preprint arXiv:1606.05250, 2016. (10 pgs).

M. Sperber et al., "Neural lattice-to-sequence models for uncertain inputs," arXiv preprint arXiv:1704.00559, 2017. (11pgs).

Y. Sun et al., "ERNIE: Enhanced Representation through Knowledge Integration," arXiv preprint arXiv:1904.09223, 2019. (8pgs).

W. Taylor, ""cloze procedure": A new tool for measuring readability," Journalism quarterly, 30(4):415-433, 1953. (19pgs).

A. Wang et al., "Glue: A multi-task benchmark and analysis platform for natural language understanding," arXiv preprint arXiv:1804.07461, 2019. (20pgs).

R. Weiss et al., "Sequence-to-sequence models can directly translate foreign speech," arXiv preprint arXiv:1703.08581, 2017. (5pgs).

R. Zheng et al., "Fluent and low-latency simultaneous speech-to-speech translation with self-adaptive training," arXiv preprint arXiv:2010.10048, 2020. (10pgs).

Y. Liu et al., "End-to-End Speech Translation with Knowledge Distillation," arXiv preprint arXiv:1904.08075, 2019. (5 pgs).

Q. Dong et al., "Consecutive decoding for speech-to-text translation," arXiv preprint arXiv: 2009.09737, 2021. (11pgs).

Q. Dong et al., ""Listen, Understand and Translate": Triple Supervision Decouples End-to-end Speech-to-text Translation," arXiv preprint arXiv: 2009.09704, 2020. (11pgs).

J. Chen et al., "Direct simultaneous speech-to-text translation assisted by synchronized streaming ASR," arXiv preprint arXiv:2106.06636, 2021. (7pgs).

R. Zheng,"Fused Acoustic and Text Encoding for Multimodal Bilingual Pretraining and Speech Translation," arXiv preprint arXiv:2102.05766v1, Feb. 10, 2021. (10pgs).

R. Zheng,"Fused Acoustic and Text Encoding for Multimodal Bilingual Pretraining and Speech Translation," arXiv preprint arXiv:2102.05766v2, Sep. 14, 2021. (11pgs).

A. Baevski et al., "wav2vec 2.0: A framework for self-supervised learning of speech representations," NeurIPS Proceedings, 2020. (12pgs).

A. B'erard et al., "End-To-End Automatic Speech Translation of Audiobooks," arXiv preprint arXiv:1802.04200, 2018. (5pgs).

J. Chen et al., "MAM: Masked acoustic modeling for end-to-end speech-to-text translation," arXiv preprint arXiv:2010.11445, 2020. (10pgs).

Chuang et al., "Speechbert: An audio-and-text jointly learned language model for end-to-end spoken question answering," arXiv preprint arXiv:1910.11559, 2020. (6pgs).

J. Devlin et al., "Bert: Pre-training of deep bidirectional transformers for language understanding," In NAACL-HLT, 2019. (16pgs).

D. Gangi et al., "MuST-C: a Multilingual Speech Translation Corpus," In NAACL, 2019. (6 pgs).

A. Graves et al., "Connectionist temporal classification: labelling unsegmented sequence data with recurrent neural networks," In Proceedings of the 23rd international conference on Machine learning, 2006. (8pgs).

J. Howard et al., "Universal language model fine-tuning for text classification," arXiv preprint arXiv:1801.06146, 2018. (12 pgs).

H. Inaguma et al., "ESPnet-ST: All-in-One Speech Translation Toolkit," arXiv preprint arXiv:2004.10234, 2020. (10pgs).

* cited by examiner

200

FUSED ACOUSTIC AND TEXT ENCODING FOR MULTIMODAL BILINGUAL PRETRAINING AND SPEECH TRANSLATION

BACKGROUND

A. Technical Field

The present disclosure relates generally to systems and methods for computer learning that can provide improved computer performance, features, and uses. More particularly, the present disclosure relates to systems and methods for speech translation using fused acoustic and text encoding.

B. Background

Deep neural networks have achieved great successes in many domains, such as computer vision, natural language processing, recommender systems, etc.

In recent years, task-agnostic text representation learning has attracted much attention in the NLP community due to its strong performance in many downstream tasks. More recently, unsupervised speech representation learning also successfully improved many speech-related tasks, such as speech recognition and speech translation.

However, existing methods suffer from two limitations: (a) they only learn from one input modality, while a unified representation for both speech and text is needed by tasks such as end-to-end speech translation, and as a result, (b) they cannot exploit various large-scale text and speech data and their performance is limited by the scarcity of parallel speech translation data.

Accordingly, what is needed are systems and methods for bilingual pre-training and speech translation with improved performance and accuracy.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. ("FIG.") 1 graphically depicts limited speech translation datasets but an abundance of datasets speech recognition and text machine translation.

DETAILED DESCRIPTION OF EMBODIMENTS

Figure 1:
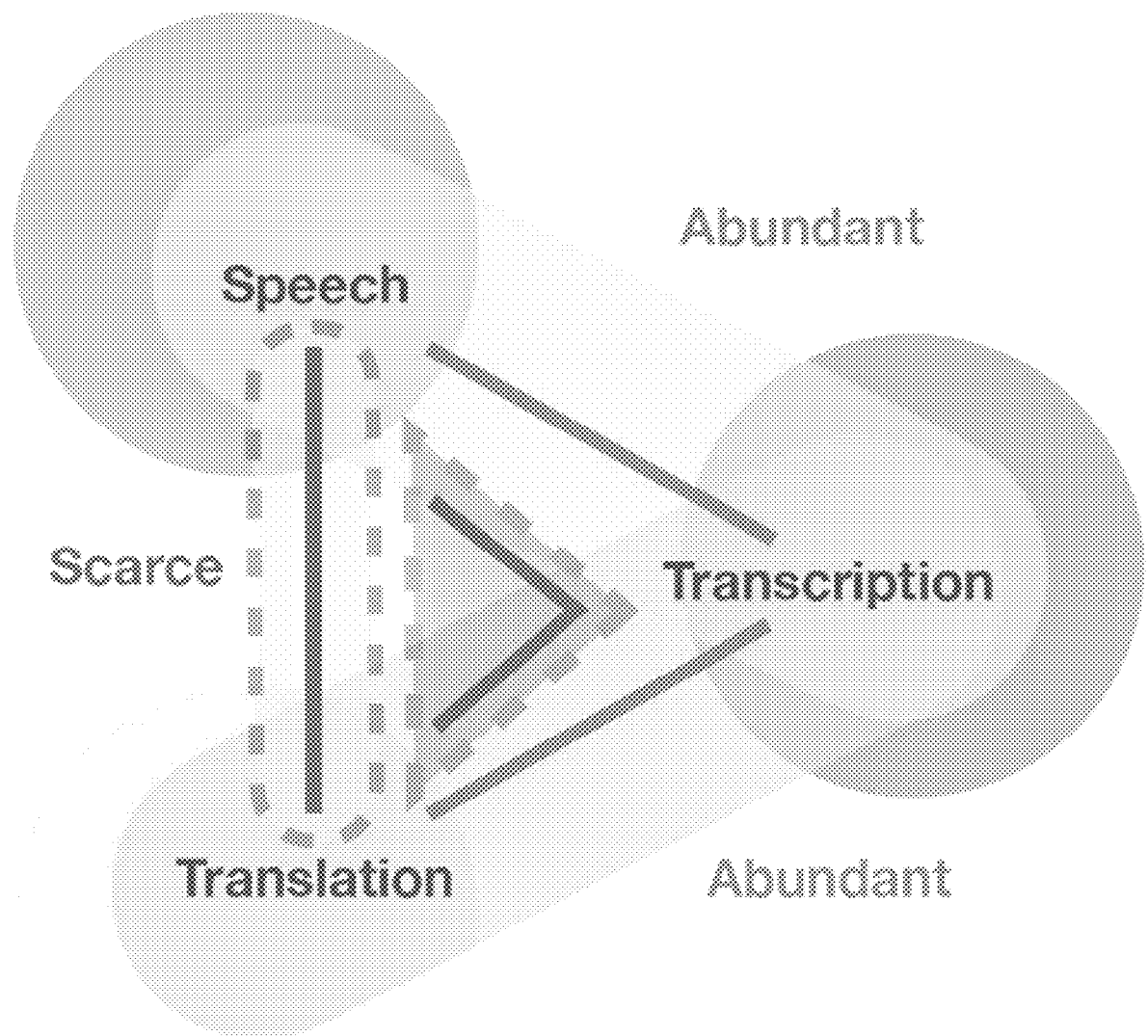

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded. A set may contain any number of elements, including the empty set.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

In recent years, task-agnostic text representation learning has attracted much attention in the NLP community due to its strong performance in many downstream tasks. More recently, unsupervised speech representation learning also successfully improved many speech-related tasks, such as speech recognition and speech translation.

However, all these existing methods can only handle one modality, either text or speech, while joint acoustic and text representation is desired for many end-to-end spoken language processing tasks, such as spoken question answering and end-to-end speech-to-text translation. For example, end-to-end speech translation (ST) is desired due to its advantages over the pipeline paradigm, such as low latency, alleviation of error propagation, and fewer parameters. The quality of end-to-end speech translation models has been limited by the scarcity of speech translation datasets. However, there is an abundance of datasets for speech, text, speech recognition, and machine translation data that can be leveraged, as shown in FIG. 1. It would be helpful if source speech and bilingual text can be encoded into a unified representation via abundant speech recognition and text machine translation data. Some show that jointly training a multi-modal ST encoder can largely improve the translation quality. However, their proposed representation learning method is constrained to the sequence-to-sequence framework and there is no experiment showing whether the proposed method can benefit from extra speech recognition and machine translation data.

The present patent disclosure presents embodiments of a fused acoustic and text masked language model (FAT-MLM) to unify the representations of different languages for bilingual cross-lingual language model pre-training and speech training. The FAT-MLM may jointly learn a unified representation for both acoustic and text input. In this way, the masked language model's input may be extended from only acoustic or text data to multimodal corpora containing both acoustic and text data, such that speech recognition and speech translation may be implemented in one model.

In one or more embodiments, a fused acoustic and text (FAT) encoder may be further extended to a sequence-to-sequence framework. Embodiments of an end-to-end fused acoustic and text speech translation model (FAT-ST) are further presented. FAT-ST may be trained from both speech and text machine translation data into a single encoder-decoder model. Meanwhile, the model may also learn from speech recognition data using an extra FAT-MLM loss. This resolves the limitation of existing single encoder and decoder speech translation models, which can only learn from scarce parallel speech translation data, but neglects much larger scale speech recognition and text machine translation data.

Contributions of the present patent disclosure include at least the following:
(1) Embodiments of FAT-MLM are presented to learn a unified acoustic and text representation;
(2) Based on FAT-MLM, embodiments of a Fused Acoustic and Text Speech Translation model (FAT-ST) are presented for speech recognition and machine translation in a single encoder-decoder framework;
(3) Spontaneous speech translation experiments on three language pairs show that by fine-tuning FAT-MLM, the accuracy of FAT-ST improves end-to-end speech translation model by +4:65 bilingual evaluation understudy (BLEU) score in average and achieves state-of-the-art, which is the first time that an end-to-end speech translation model achieves similar performance with the strong cascaded system in these three translation directions of this dataset, while still maintaining a smaller model size and faster decoding time; and
(4) The present patent disclosure experimentally shows that FAT-MLM trained with additional speech recognition, machine translation, and monolingual text data may improve FAT-ST by +1:25 BLEU score. FAT-ST may be further improved by using additional speech recognition and machine translation data.

B. Some Related Work

1. Masked Language Modeling

Figure 2A:
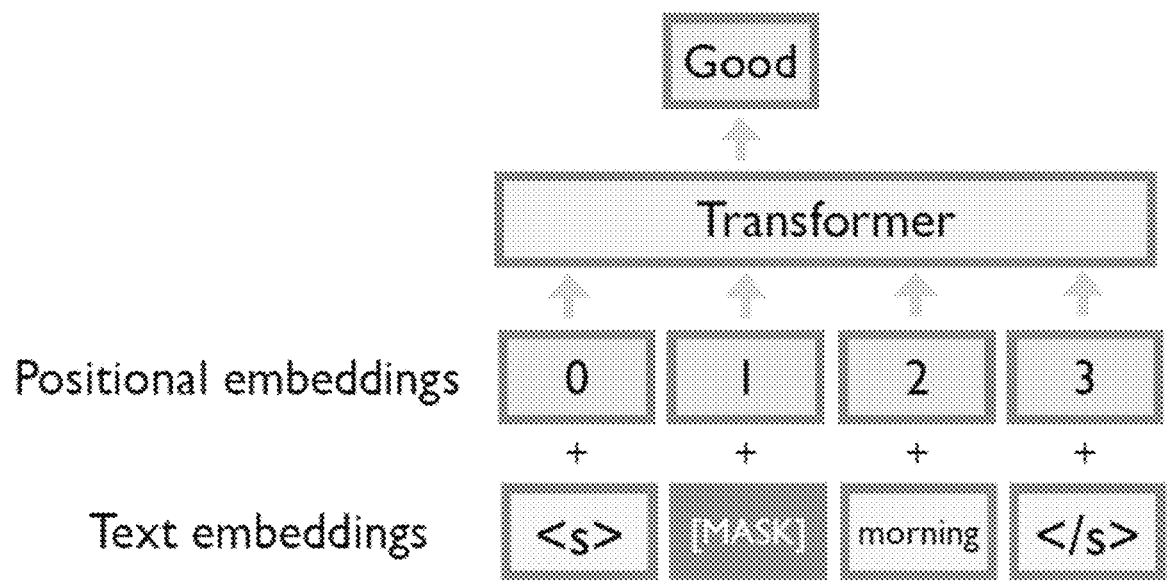
FIG. 2A depicts previous work of masked language model (MLM) for text representation learning.

Some investigated language modeling for pre-training transformer encoders. Instead of using unidirectional language models for pre-training, others proposed BERT which enables deep bidirectional representation pre-training by a masked language modeling (MLM) objective, as shown in FIG. 2A, which randomly masks some tokens from the input and uses an objective to recover the masked tokens based only on their context. Such approaches lead to drastic improvements on several natural language understanding tasks including text classification and question answering.

2. Translation Language Modeling

Figure 2B:
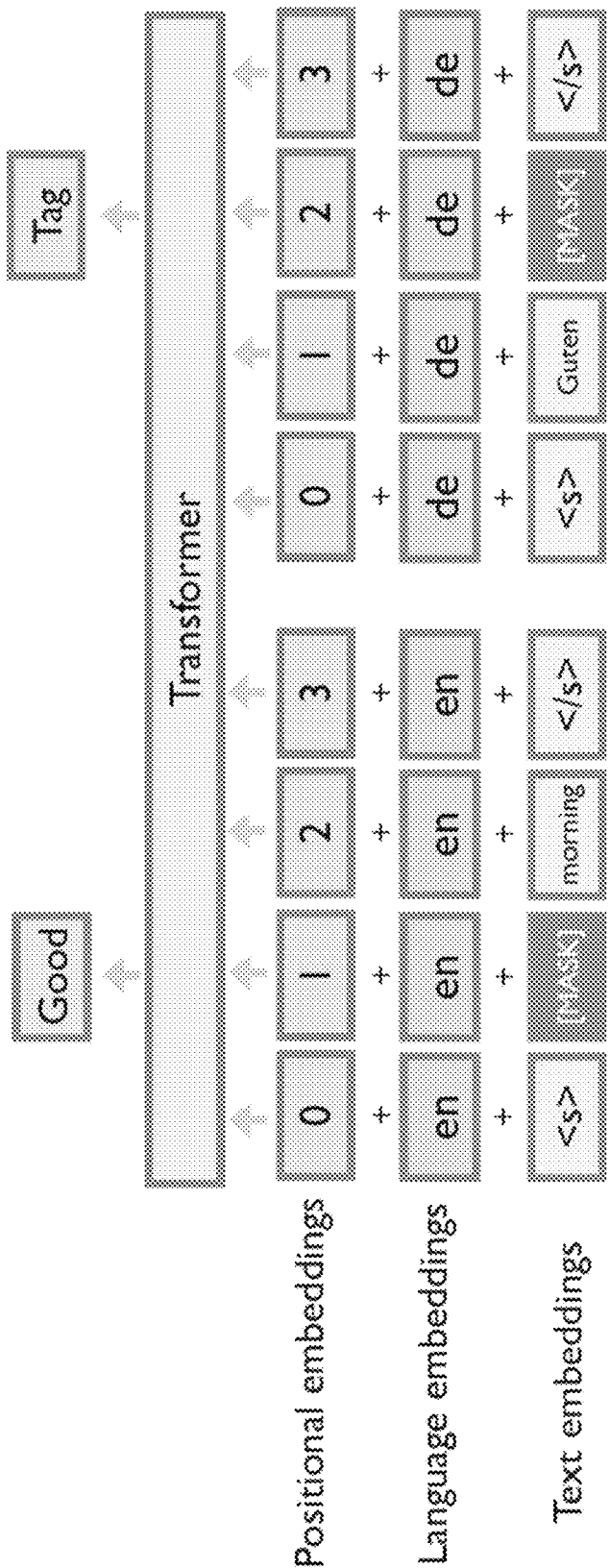
FIG. 2B depicts previous work of translation language model (TLM) for cross-lingual text representation learning.

Some extend MLM to cross-lingual pre-training by proposing two methods: one unsupervised that only relies on monolingual data, and one supervised that leverages parallel data with a new cross-lingual language model objective which is called Translation Language Model (TLM). As shown in FIG. 2B, TLM encodes both source and target sentences from parallel data after masking several tokens with [MASK], and then learns to recover the masked tokens. Experiments show that TLM achieves state-of-the-art results on cross-lingual classification, unsupervised and supervised machine translation.

3. Masked Acoustic Model

Figure 2C:
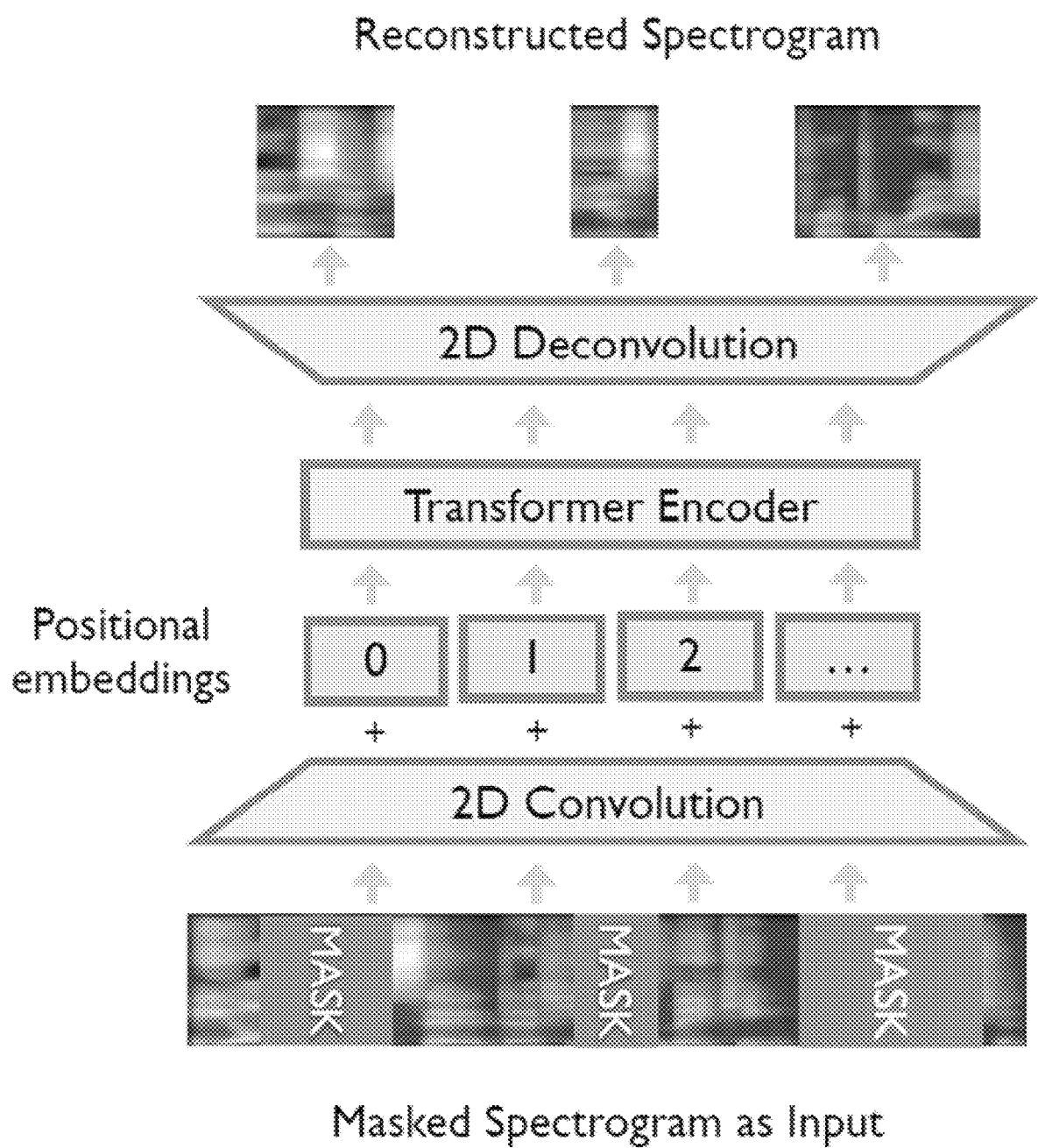
FIG. 2C depicts previous work of masked acoustic model (MAM) for speech representation learning.

Recently, some propose to learn a speech encoder in a self-supervised fashion on the speech side, which can utilize speech data without transcription. This technique, Masked Acoustic Modeling (MAM), may also perform pre-training on any acoustic signals (including non-speech ones) without annotation. The architecture of MAM is shown in FIG. 2C. Similar to MLM, MAM replaces a span of speech spectrogram with mask tokens [MASK]. After a 2D convolution layer and a transformer encoder, MAM learns to recover the masked spectrogram via a 2D deconvolution layer during training. It is shown that MAM can improve end-to-end speech translation as either an additional loss or a pre-training model. Parallel to MAM, others propose a wav2vec 2.0 pre-training model, which masks a speech input in the latent space and pre-trains the model via a contrastive task defined over a quantization of the latent representations.

C. Embodiments of FAT-MLM

Although existing pre-training models show a strong representation learning ability and significantly improve upon many down-streaming tasks, they all can only learn the representation for either text or speech. However, a unified speech and text multi-modal representation is useful for many end-to-end spoken language processing tasks.

To address this problem, embodiments of FAT-MLM, a multimodal pre-training model which encodes acoustic and text into a unified representation, are disclosed in the present disclosure. Different from the method of relying on shared sub-word vocabulary to align representation of different languages to learn a unified representation of different languages, FAT-MLM is a multimodal model involving both acoustic and text. In one or more embodiments, FAT-MLM may use parallel speech recognition data. In the following sections, embodiments of monolingual FAT-MLM are first introduced, followed by extension of monolingual FAT-MLM to translation scenario.

1. Embodiments of Monolingual FAT-MLM

Figure 3A:
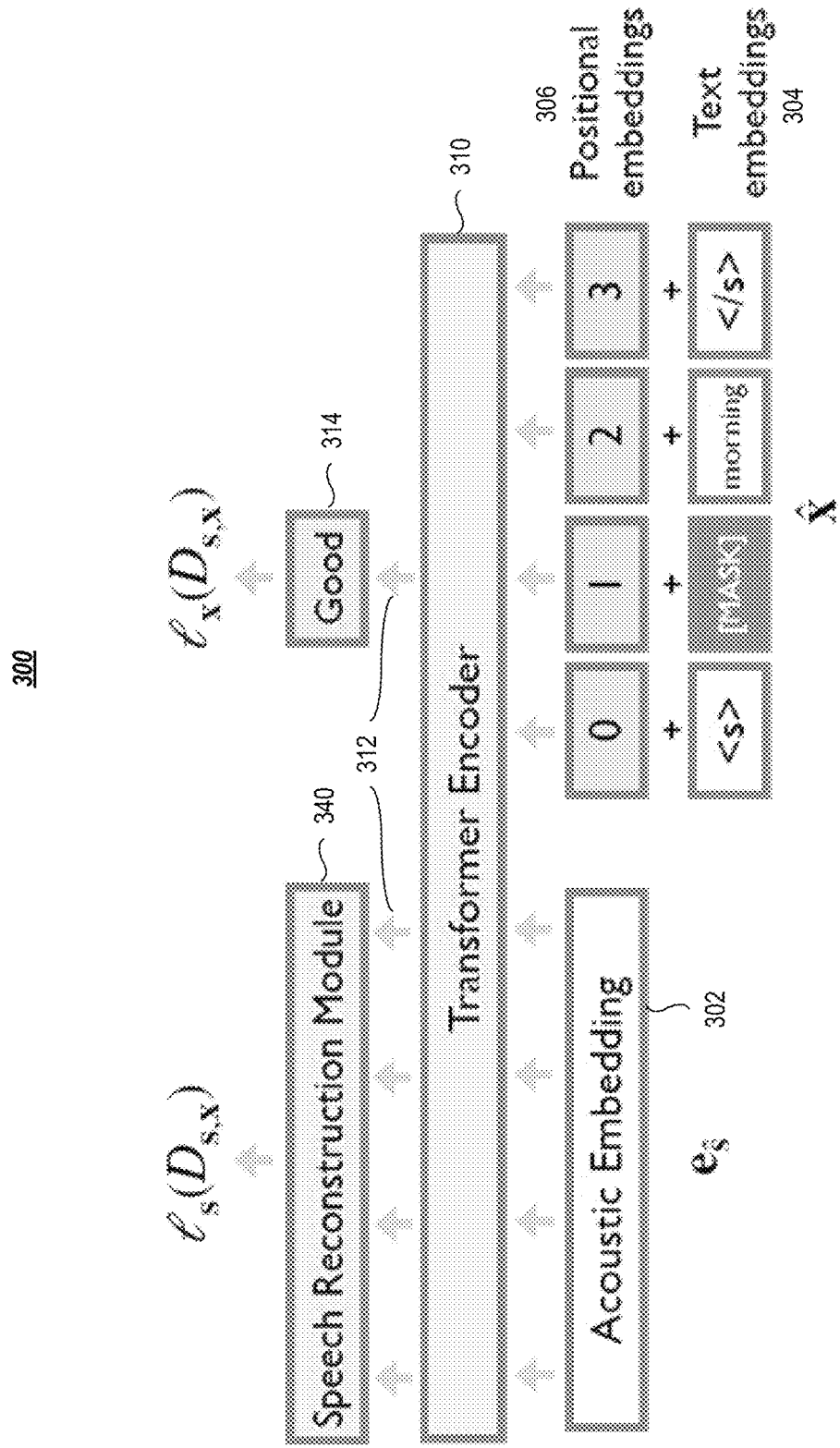
FIG. 3A depicts a monolingual fused acoustic and text-masked language model (FAT-MLM), according to embodiments of the present disclosure.

FIG. 3A graphically depicts a Monolingual FAT-MLM, according to embodiments of the present disclosure. The monolingual FAT-MLM 300 takes speech and transcription tuples as input, denoted as $D_{s,x} = \{(s, x)\}$, where $s=(s_1, \ldots, s_{|s|})$ is a sequence of acoustic features $s_t \in \mathbb{R}^{d_s}$ which may be the spectrogram or mel-spectrogram of speech audio, each $s_t$ represents a frame-level speech feature, and $x=(x_1, \ldots, x_{|x|})$ is the sequence of the corresponding transcription.

Figure 3B:
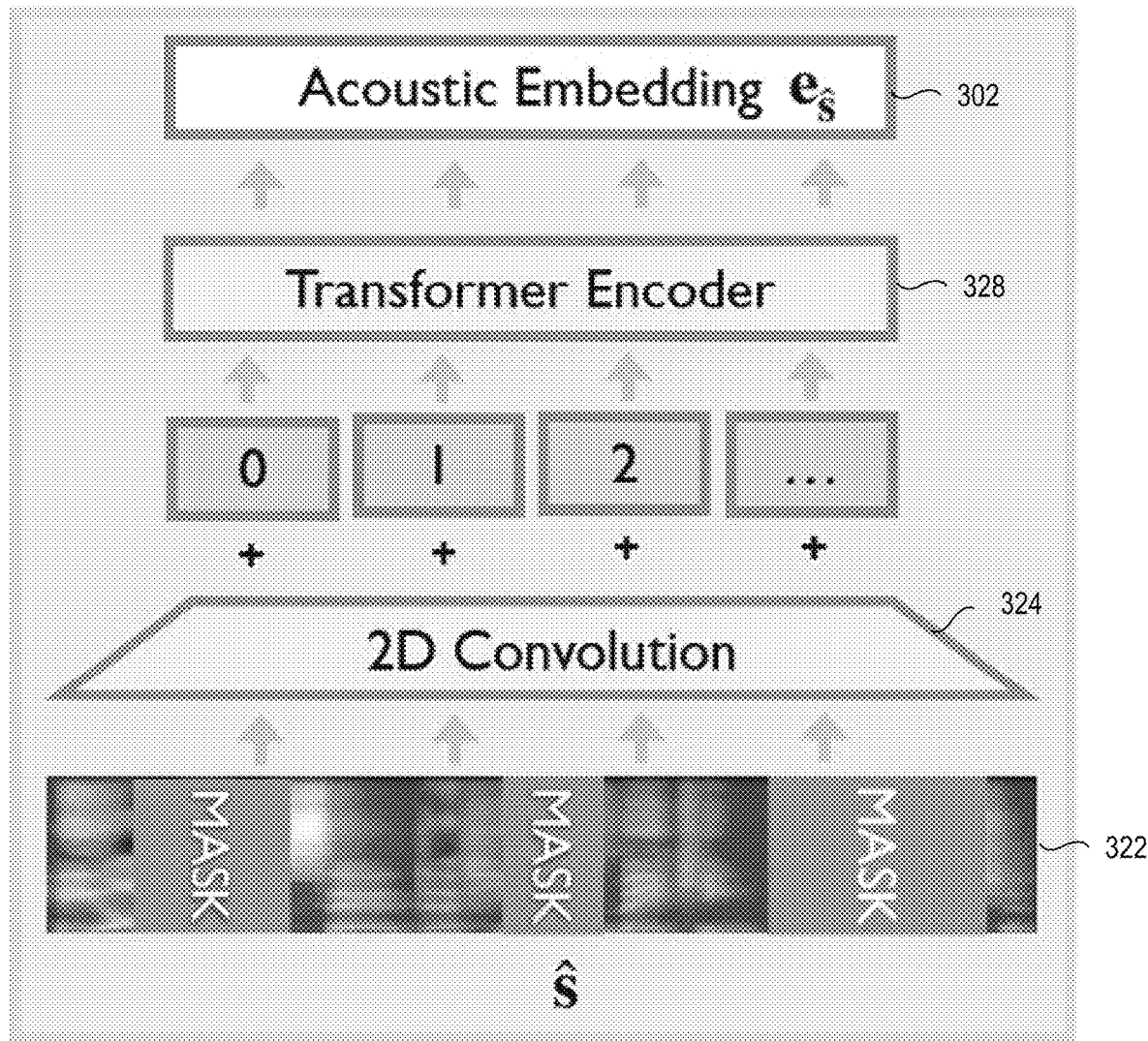
FIG. 3B depicts an acoustic embedding module of a FAT-MLM, according to embodiments of the present disclosure.

In one or more embodiments, one or more acoustic features $s_t$ in the sequence of s may be randomly masked by a random acoustic feature masking function $\text{Mask}_{span}(\cdot)$ over the input s, as shown in FIG. 3B.

$$\hat{s} \sim \text{Mask}_{span}(s, \lambda) \quad (1)$$

In equation (1), $\text{Mask}_{span}(\cdot)$ replaces one or more random spans of s by the probability of $\lambda$ (e.g., 30% in one or more embodiments) with a random initialized vector $\epsilon_s \in \mathbb{R}^{d_s}$ to obtain a masked sequence $\hat{s}$. In one or more embodiments, $\hat{s}$ is encoded with convolutions 324 and a transformer encoder 328 into acoustic embeddings $e_{\hat{s}}$ 302. Similarly, tokens in x may be randomly masked by a random token masking function over the input x:

$$\hat{x} \sim \text{Mask}_{token}(x, \lambda) \quad (2)$$

In equation (2), $\text{Mask}_{token}(\cdot)$ replaces one or more random spans of x by the probability of $\lambda$ (e.g., 30% in one or more embodiments) with a random initialized vector $\epsilon_{token} \in \mathbb{R}^{d_x}$. Afterwards, the acoustic embeddings $e_{\hat{s}}$ and the masked sequence of tokens $\hat{x}$ are concatenated into concatenated embeddings $[e_{\hat{s}}; \hat{x}]$. A multimodal transformer encoder 310 generates a unified latent representation $f[e_{\hat{s}}; \hat{x}]$ 312 based on the concatenated embeddings. In one or more embodiments, positional embeddings, e.g., positional embeddings 306, may be used to reset for different types of input. The unified latent representation $f[e_{\hat{s}}; \hat{x}]$ may be used to generate a reconstructed spectrogram by a speech reconstruction module 340 and one or more reconstructed tokens 314 corresponding to the one or more masked tokens.

In one or more embodiments, the training objective of monolingual FAT-MLM includes a speech reconstruction loss $\ell_s(D_{s,x})$ and a text reconstruction loss $\ell_x(D_{s,x})$. For speech input s, the following training objective may be used to reconstruct the original speech signal with the surrounding context information:

$$\ell_s(D_{s,x}) = \Sigma_{(s,x) \in D_{s,x}} \| s - g(f([e_{\hat{s}}; \hat{x}])) \|_2^2 \quad (3)$$

In equation (3), g is a reconstruction function (e.g., a 2D deconvolution) to recover the original signal from encoded representation $f[e_{\hat{s}}; \hat{x}]$. In one or more embodiments, mean squared error is used for measuring the difference between s and the reconstructed acoustic features (e.g., spectrogram) $g(f[e_{\hat{s}}; \hat{x}])$. In one or more embodiments, for transcription input x, cross-entropy loss, denoted below, may be used to reconstruct the masked token.

$$\ell_x(D_{s,x}) = -\Sigma_{(s,x) \in D_{s,x}} \log p(x | [e_{\hat{s}}; \hat{x}]) \quad (4)$$

The final loss for monolingual FAT-MLM $\ell_{FAT-MLM}(D_{s,x})$ is a multimodal loss, which may be expressed as:

$$\ell_{FAT-MLM}(D_{s,x}) = \ell_s(D_{s,x}) + \ell_x(D_{s,x}) \quad (5)$$

Figure 3C:
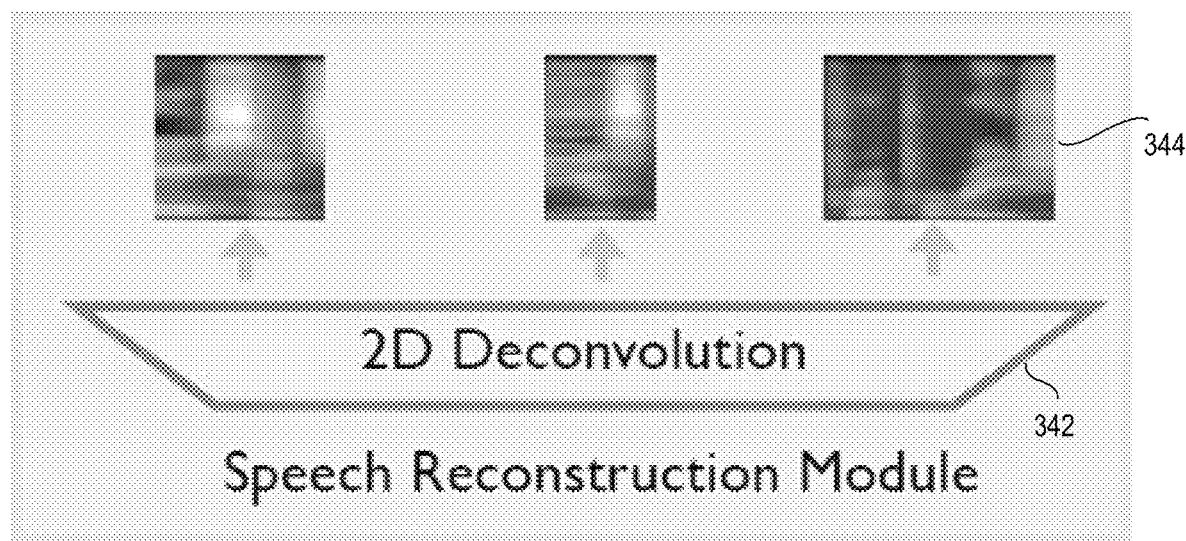
FIG. 3C depicts a speech reconstruction module of a FAT-MLM, according to embodiments of the present disclosure.

In one or more embodiments, g is a reconstruction function of a speech reconstruction module 340 as shown in FIG. 3C. The speech reconstruction module 340 may comprise one or more 2D deconvolution layers 342 to generate a reconstructed spectrogram $g(f[e_{\hat{s}}; \hat{x}])$ 344 from the unified latent representation $f[e_{\hat{s}}; \hat{x}]$ 312, which is output by the multimodal transformer encoder 310. The difference between the reconstructed spectrogram $g(f[e_{\hat{s}}; \hat{x}])$ and the sequence s may be used to build a speech reconstruction loss $\ell_s(D_{s,x})$ for model training.

Figure 4:
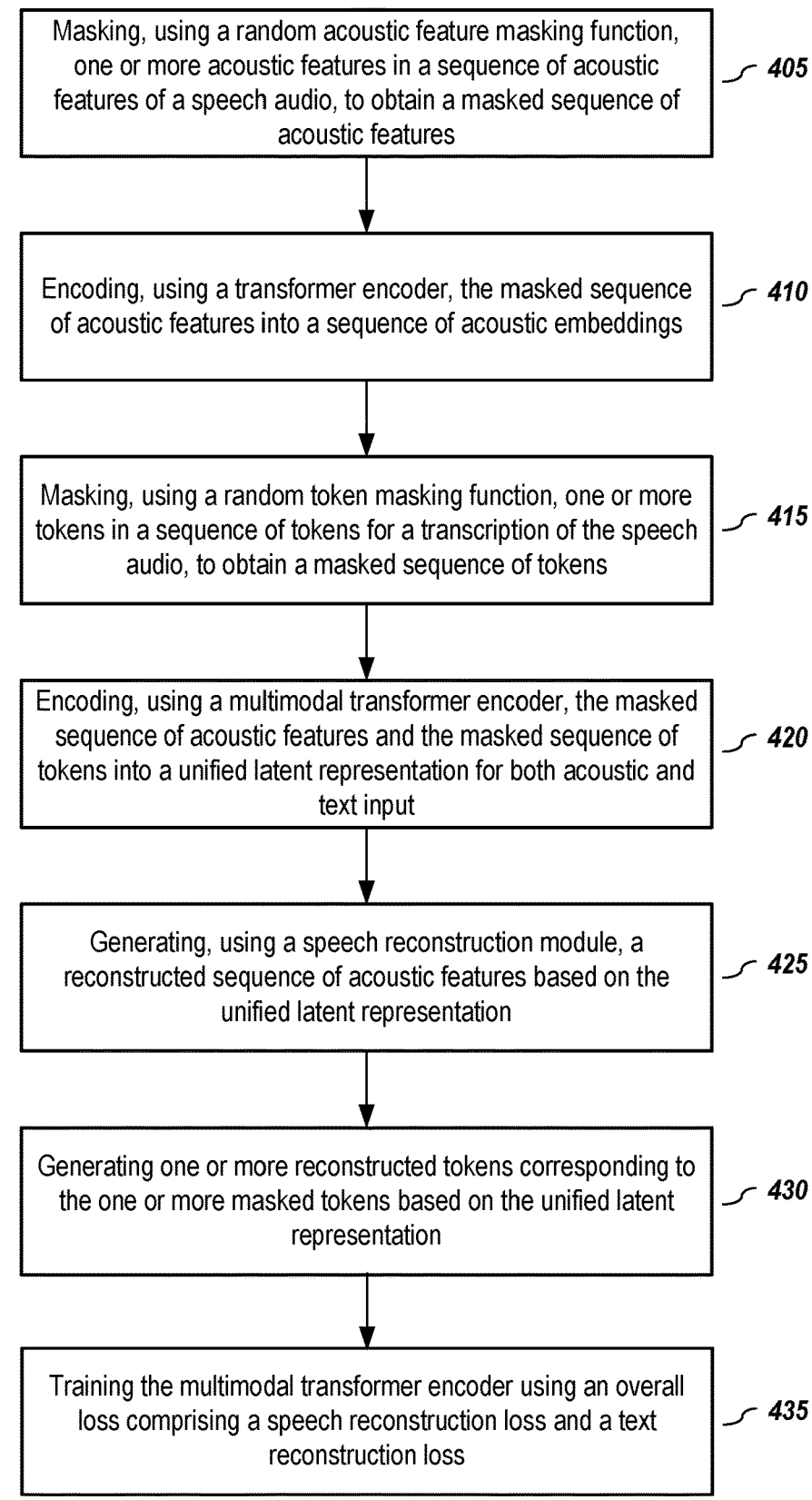
FIG. 4 depicts a process for pre-training a multimodal transformer encoder, according to embodiments of the present disclosure.

FIG. 4 depicts a process for pre-training a multimodal transformer encoder, according to embodiments of the present disclosure. For a speech audio, a sequence of acoustic features of a speech audio is masked (405), using a random acoustic feature masking function to mask randomly one or more acoustic features, to obtain a masked sequence of acoustic features. The masked sequence of acoustic features is encoded (410), using a transformer encoder, into a sequence of acoustic embeddings. A sequence of tokens for a transcription of the speech audio is masked (415), using a random token masking function to randomly mask one or more tokens, to obtain a masked sequence of tokens. In one or more embodiments, the random masking ratios for the sequence of acoustic features and for the sequence of tokens may or may not be the same. The masked sequence of acoustic features and the masked sequence of tokens are encoded (420), using a multimodal transformer encoder, into a unified latent representation for both acoustic and text input. A reconstructed sequence of acoustic features is generated (425), using a speech reconstruction module, based on the unified latent representation. One or more reconstructed tokens corresponding to the one or more masked tokens are generated (430) based on the unified latent representation. The multimodal transformer encoder is trained (435) using an overall loss comprising a speech reconstruction loss and a text reconstruction loss. In one or more embodiments, the speech reconstruction loss is based on a mean squared error between the sequence of acoustic features and the sequence of reconstructed sequence of acoustic features, and the text reconstruction loss is a cross-entropy loss based on the one or more reconstructed tokens.

2. Embodiments of Translation FAT-MLM

In one or more embodiments, to support multimodal cross-lingual tasks such as speech translation, monolingual FAT-MLM may be extended to translation FAT-MLM by using additional target language translation of the source language transcription as input. A translation FAT-MLM may take $D_{s,x,y}=\{(s,x,y)\}$ as input, where $y=(y_1, \ldots, y_{|y|})$ denotes a sequence of target tokens for translation transcription in a target language. This kind of triplet input is very common in speech translation corpus.

Figure 5:
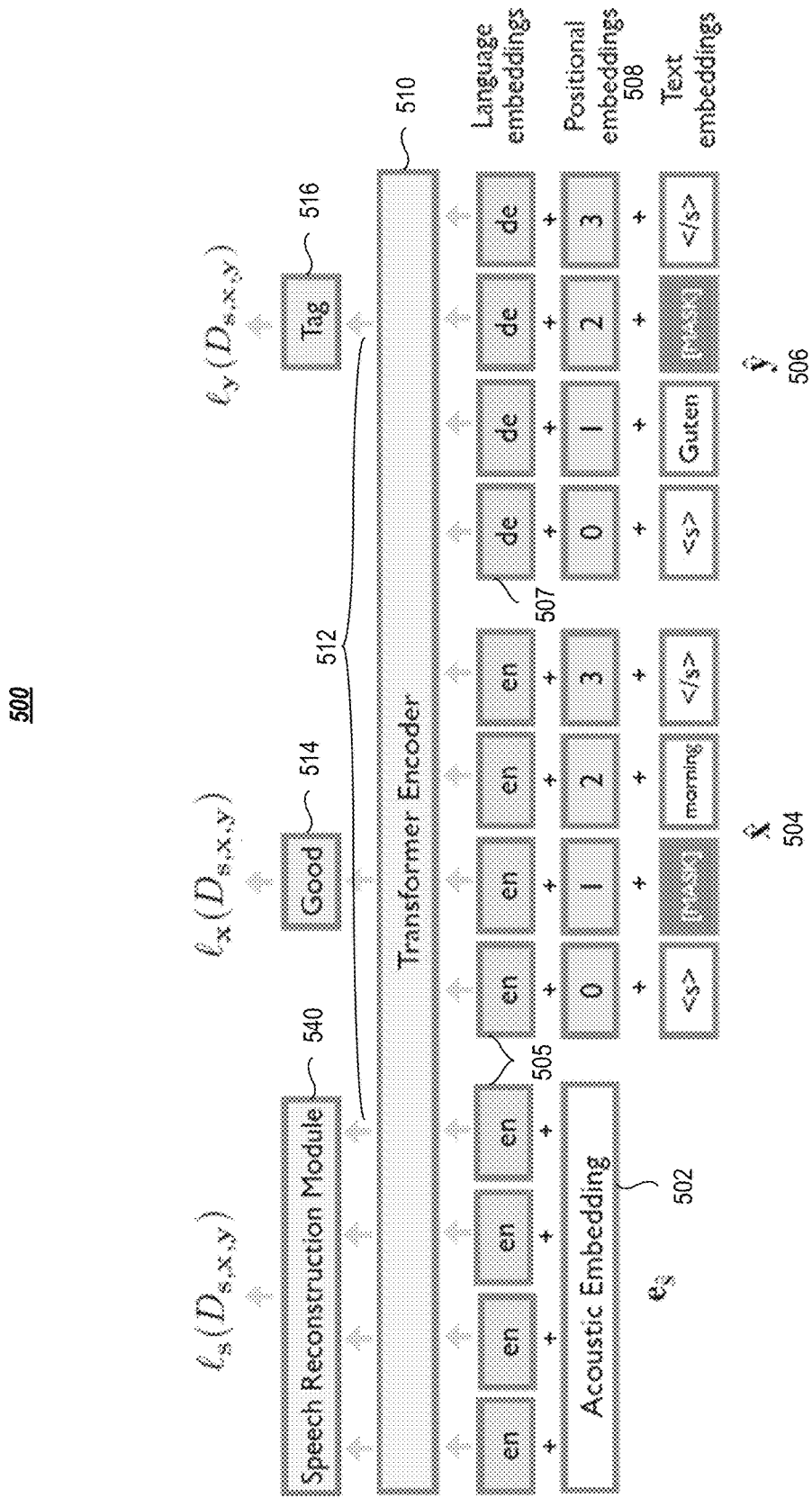
FIG. 5 graphically depicts a translation FAT-MLM, according to embodiments of the present disclosure.

FIG. 5 graphically depicts a translation FAT-MLM, according to embodiments of the present disclosure. As shown in the figure, source language embeddings $e_{src}$ 505 and target language embeddings $e_{tgt}$ 507 for different languages may be incorporated to show the language difference. Specifically, the source language embeddings $e_{src}$ 505 may be incorporated into or with the acoustic embeddings $e_{\hat{s}}$ 502 and a masked sequence of source language tokens $\hat{x}$ 504 to form source language incorporated acoustic embeddings ($e_{\hat{s}}+e_{src}$) and a sequence of source language incorporated tokens ($\hat{x}+e_{src}$). In one or more embodiments, the acoustic embeddings $e_{\hat{s}}$ 502 and the masked sequence of source language tokens $\hat{x}$ 504 may be generated in a process similar to steps 405-415 shown in FIG. 4. In one or more embodiments, positional embeddings 508 may be used to align the masked sequence of source language tokens $\hat{x}$ and the masked sequence of target language tokens y for cross-lingual alignment.

Similar to monolingual FAT-MLM, the translation FAT-MLM randomly masks, using a random target token masking function, one or more target tokens in a sequence of target tokens y to obtain a masked sequence of target language tokens $\hat{y}\sim Mask_{token}(y, \lambda)$. Similar to $e_{\hat{s}}$ and $\hat{x}$, the masked sequence of target language tokens Y may be incorporated with target language embeddings et to form a sequence of target language incorporated target tokens ($\hat{y}+e_{tgt}$), which concatenates with the source language incorporated acoustic embeddings ($e_{\hat{s}}+e_{src}$) and the sequence of source language incorporated tokens ($\hat{x}+e_{src}$) to form concatenated embeddings $h_{s,x,y}$:

$$h_{s,x,y}=[e_{\hat{s}}+e_{src};\hat{x}+e_{src};\hat{y}+e_{tgt}] \quad (6)$$

A multimodal transformer encoder 510 encodes the concatenated embeddings $h_{s,x,y}$ into a unified representation $f(h_{s,x,y})$ 512 for speech, source language texts, and target language texts. The unified representation $f(h_{s,x,y})$ may be used to reconstruct a reconstructed sequence of acoustic features using a speech reconstruction module 540, one or more reconstructed source tokens 514 corresponding to the one or more masked source tokens, one or more reconstructed target tokens 516 corresponding to the one or more masked target tokens.

In one or more embodiments, the reconstruction losses for different masked input may comprise a speech reconstruction loss $\ell_s(D_{s,x,y})$, a source text reconstruction loss $\ell_x(D_{s,x,y})$, and a target text reconstruction loss $\ell_y(D_{s,x,y})$, which may be expressed as:

$$\ell_s(D_{s,x,y})=\Sigma_{(s,x,y)\in D_{s,x,y}}\|s-g(f(h_{s,x,y}))\|_2^2 \quad (7)$$

$$\ell_x(D_{s,x,y})=-\Sigma_{(s,x,y)\in D_{s,x,y}} \log p(x|h_{s,x,y}) \quad (8)$$

$$\ell_y(D_{s,x,y})=-\Sigma_{(s,x,y)\in D_{s,x,y}} \log p(y|h_{s,x,y}) \quad (9)$$

In one or more embodiments, the above loss functions may be summed for the final loss function of translation FAT-MLM:

$$\ell_{FAT-MLM}(D_{s,x,y})=\ell_s(D_{s,x,y})+\ell_x(D_{s,x,y})+\ell_y(D_{s,x,y}) \quad (10)$$

To fully utilize the corpora for different tasks, FAT-MLM may take any combination of speech, transcription, translation triplets $D_{2\{s,x,y\}}$ as input, which is the power set of $\{s,x,y\}$ triplets. Specifically, these combinations include speech only data $\{s\}$, monolingual text data, $\{x\}$ or $\{y\}$, speech and transcription tuple $\{(s,x)\}$ for speech recognition, transcription and translation tuple $\{(x,y)\}$ for machine translation, speech and translation tuple $\{(s, y)\}$ for direct speech translation, and speech transcription translation triplets $\{(s, x,y)\}$. For different combinations of input, FAT-MLM may encode the full concatenation of their embeddings and recovers the masked portion. In one or more embodiments, the full loss function may be expressed as:

$$\ell_{FAT-MLM}(D_{2\{s,x,y\}})=\ell_s(D_{s*})+\ell_x(D_{x*})+\ell_y(D_{y*}) \quad (11)$$

In Equation (11), $D_{s*}$, $D_{x*}$, $D_{y*}$ means any input including speech, source language text and target language text respectively. It shall be noted that in this framework, losses for MLM, TLM, and MAM are denoted as $\ell_x(D_x)$, $\ell_{x,y}(D_{x,y})$, and $\ell_s(s)$ respectively.

Figure 6:
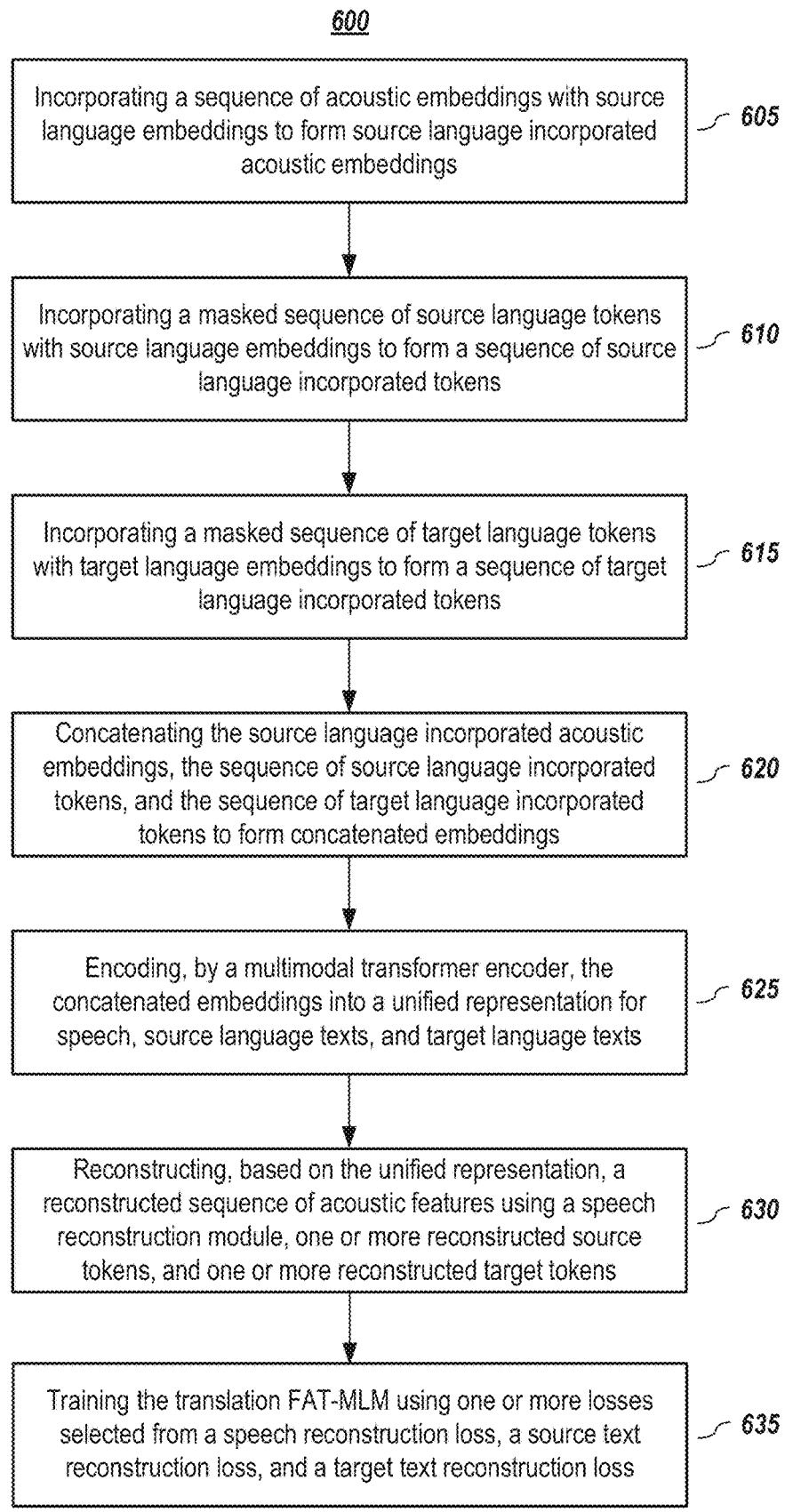
FIG. 6 depicts a process for translation FAT-MLM training, according to embodiments of the present disclosure.

FIG. 6 depicts a process for pre-training a translation FAT-MLM, according to embodiments of the present disclosure. Given a speech audio in a source language, a sequence of acoustic embeddings is incorporated with source language embeddings to form (605) source language incorporated acoustic embeddings. Similar to the sequence of acoustic embeddings 302, the sequence of acoustic embeddings may be obtained by encoding a sequence of masked acoustic features of the speech audio. The sequence of masked acoustic features may be generated by randomly masking one or more acoustic features in a sequence of acoustic features for the speech audio.

A masked sequence of source language tokens is incorporated with source language embeddings to form (610) a sequence of source language incorporated tokens. Similar to the sequence of tokens R shown in FIG. 3A, the sequence of source language tokens $\hat{x}$ for the translation FAT-MLM may be obtained by randomly masking one or more tokens in a sequence x of tokens corresponding to the transcription of the speech audio.

A masked sequence f of target language tokens is incorporated with target language embeddings to form (615) a sequence of target language incorporated tokens. The sequence of target language tokens f may be obtained by randomly masking one or more tokens in a sequence y of tokens corresponding to the translation transcription in a target language of the transcription in the source language.

The source language incorporated acoustic embeddings, the sequence of source language incorporated tokens, and the sequence of target language incorporated tokens are concatenated (620) to form concatenated embeddings $h_{s,x,y}$, which are encoded (625) by a multimodal transformer encoder into a unified representation $f(h_{s,x,y})$ for speech, source language texts, and target language texts.

The unified representation is used to reconstruct (630) a reconstructed sequence of acoustic features using a speech reconstruction module, one or more reconstructed source tokens corresponding to the one or more masked source tokens, one or more reconstructed target tokens corresponding to the one or more masked target tokens. The translation FAT-MLM is trained (635) using one or more losses selected from a speech reconstruction loss $\ell_s(D_{s,x,y})$, a source text reconstruction loss $\ell_x(D_{s,x,y})$, and a target text reconstruction loss $\ell_y(D_{s,x,y})$. In one or more embodiments, the translation FAT-MLM may be trained using a summation of all these reconstruction losses.

3. Embodiments of Attention Visualization

Figure 7:
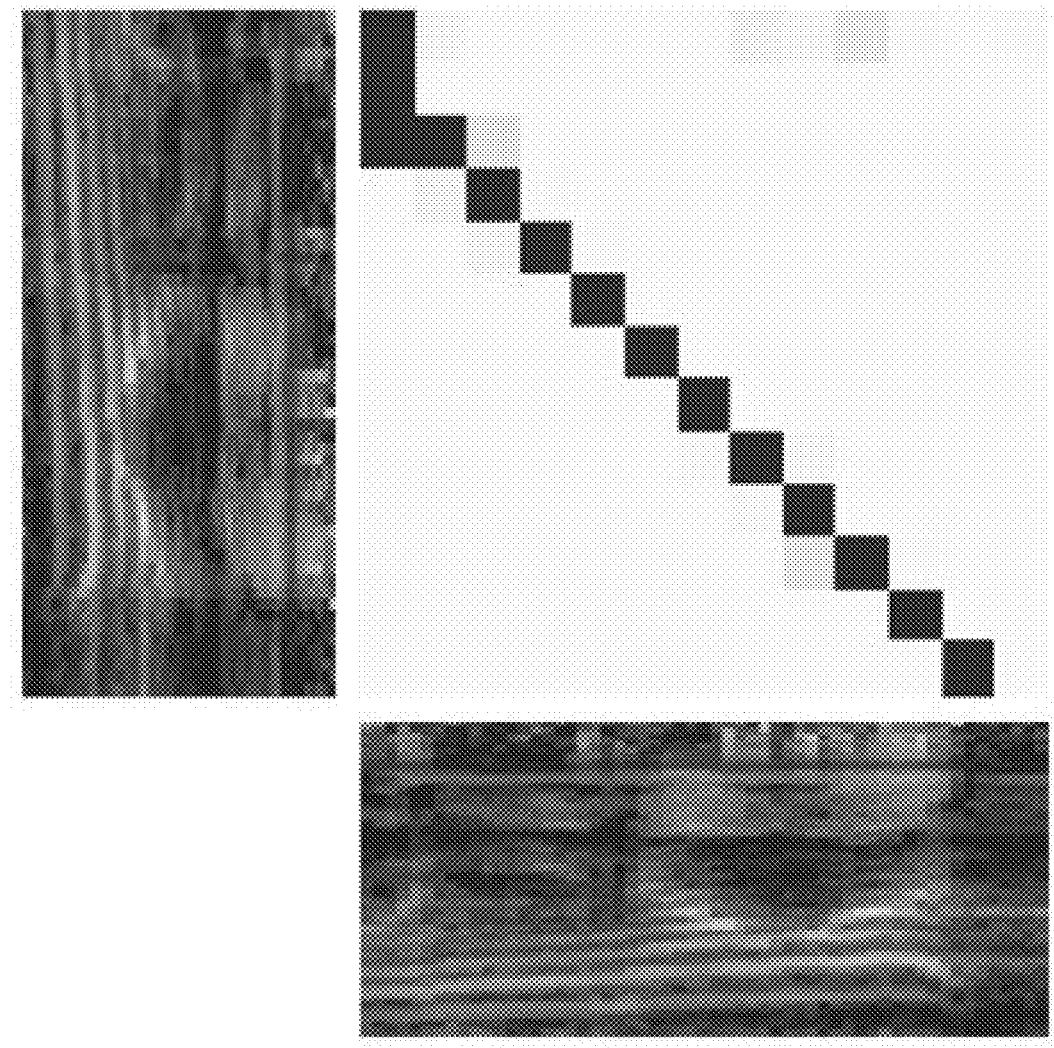
FIG. 7 graphically depicts self-attention layers of a translation FAT-MLM, according to embodiments of the present disclosure.
Figure 8A:
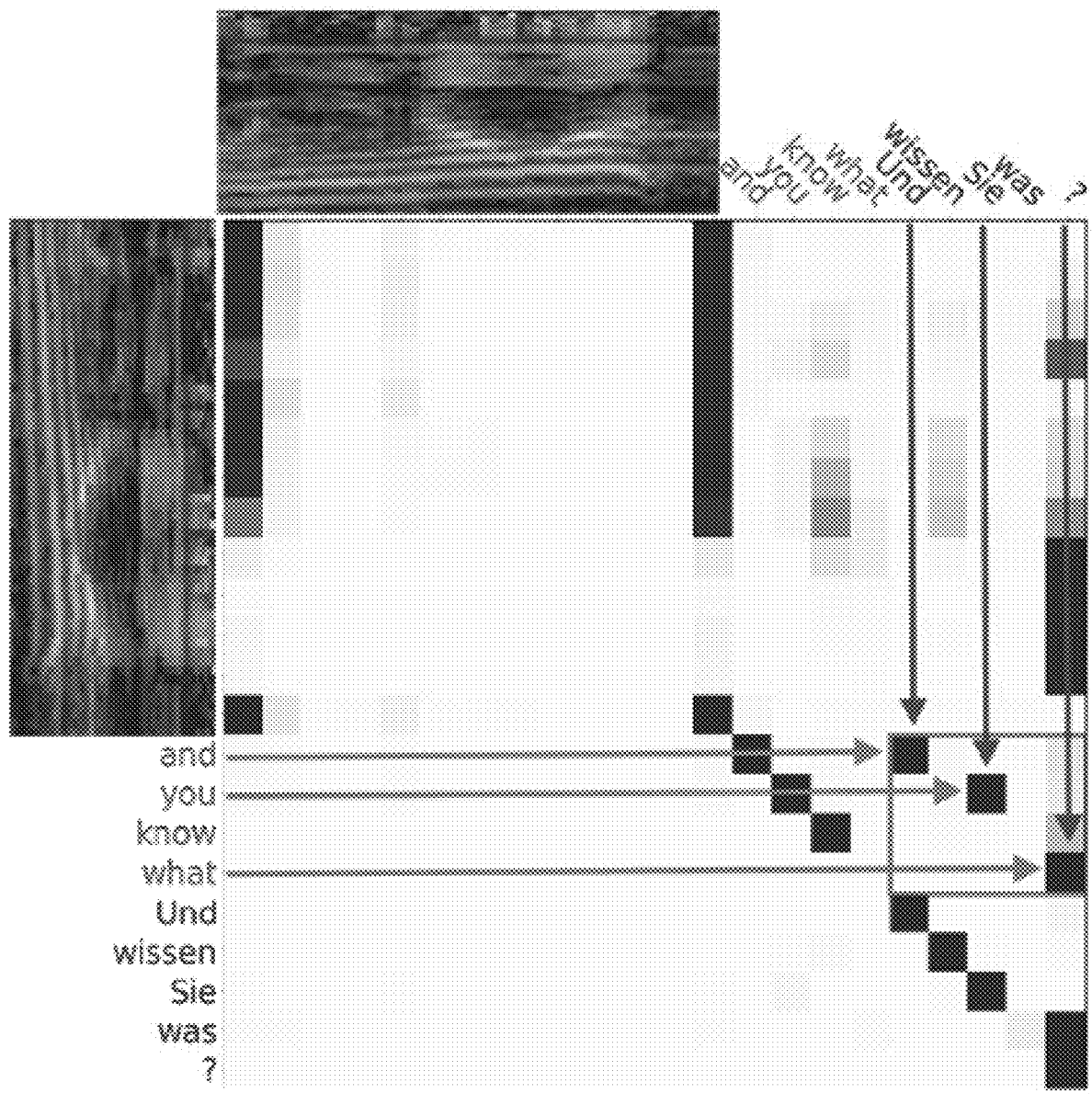
FIG. 8A depicts a good cross-lingual alignment between two languages in a FAT-MLM, according to embodiments of the present disclosure.
Figure 8B:
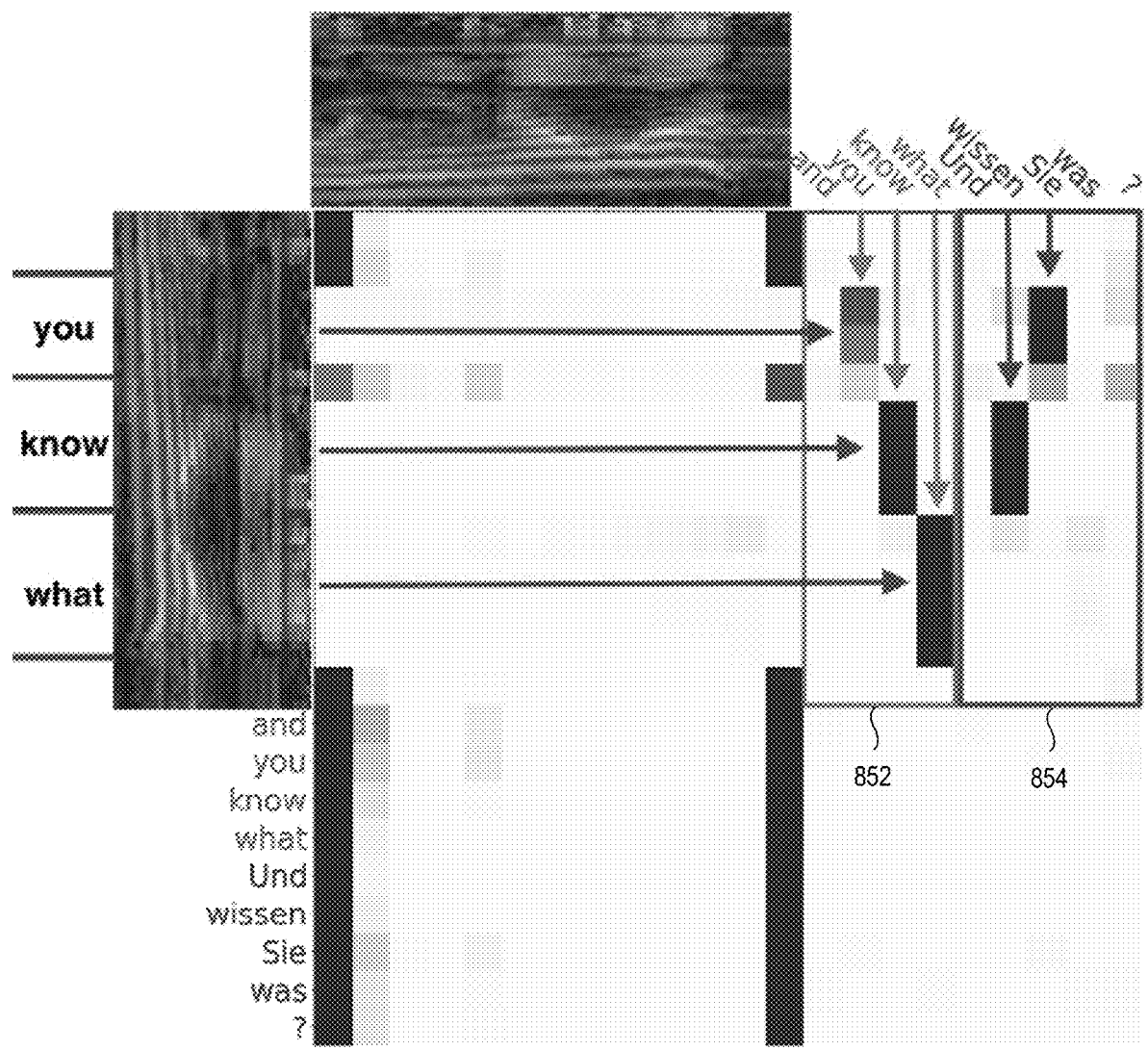
FIG. 8B depicts a clear monotonic speech-to-text cross-modal attention in a FAT-MLM, according to embodiments of the present disclosure.

To demonstrate FAT-MLM's ability to unify the representation of different modalities and languages, the self-attention layers of a translation FAT-MLM are graphically shown in FIG. 7, FIG. 8A, and FIG. 8B. FIG. 7 graphically shows the output of one speech self-attention head at the first transformer layer in the acoustic embedding module and its corresponding spectrogram. The model in FIG. 7 is a translation FAT-MLM model trained with speech translation En→De dataset. The clear monotonic attention in FIG. 7 shows that a FAT-MLM method may learn good representation for speech.

FIG. 8A and FIG. 8B show output of two self-attention heads at the first layer of acoustic and text shared transformer from a translation FAT-MLM model trained with speech translation dataset, annotated with corresponding spectrogram, transcription (English), and translation (German). FIG. 8A shows that FAT-MLM may learn a good cross-lingual alignment between two languages, such as and to Und and you to Sie. The self-attention head shows bilingual alignment between "and" and "Und", "you" and "Sie", "what" and "?" in transcription and translation respectively. FIG. 8B shows that FAT-MLM is able to learn a clear monotonic speech-to-text cross-modal attention like many speech recognition models. In FIG. 8B, the left side spectrogram shows gold speech-transcription alignment. This self-attention head shows monotonic cross-modal attention in box 852. Meanwhile, the speech-to-translation attention (in box 854) clearly shows the alignment between "you" and "Sie", "know" and "wissen" in speech and translation respectively. It shall be noted that in this speech, the pronunciation of "and" is very weak.

D. Embodiments of FAT-ST

This section discloses how to adapt FAT-MLM to speech translation and enable speech translation models to learn from speech recognition and text machine translation.

1. From Text Translation to Speech Translation

Regardless of the particular design of different seq-to-seq models, the text machine translation encoder always takes the input sequence $x=(x_1, \ldots, x_n)$ where each $x_i \in \mathbb{R}^{d_x}$ is a word embedding of $d_x$ dimensions, and produces a new sequence of hidden states $h=f(x)=(h_1, \ldots, h_n)$. On the other hand, a decoder predicts the next output word $y_t$ given the source sequence (actually its representation h) and previously generated words, denoted $y_{<t}=(y_1, \ldots, y_{t-1})$. The decoder stops when it emits <eos>, and the final hypothesis $y=(y_1, \ldots, <eos>)$ has probability:

$$p(y|x)_{MT} = \prod_{t=1}^{|y|} p(y_t|x, y_{<t}) \quad (12)$$

At training time, the conditional probability of each ground-truth target sentence or transcription y* is maximized given input x over the whole training data $D_{x,y}$, or equivalently minimizing the following loss:

$$\ell_{MT}(D_{x,y}) = -\Sigma_{(x,y) \in D_{x,y}} \log p(y|x) \quad (13)$$

Different from text machine translation, speech translation takes speech features $s=(s_1, \ldots, s_{|s|})$ as input. Same as the speech input portion of FAT-MLM, these speech features are converted from the speech signals (e.g. spectrogram).

Formally, the decoding and training of speech translation models can be defined as follows:

$$p(y|s)_{ST} = \prod_{t=1}^{|y|} p(y_t|s, y_{<t}) \quad (14)$$

$$\ell_{ST}(D_{s,y}) = -\sum_{(s,y) \in D_{s,y}} \log p(y|s) \quad (15)$$

2. Embodiments of FAT-ST

Figure 9:
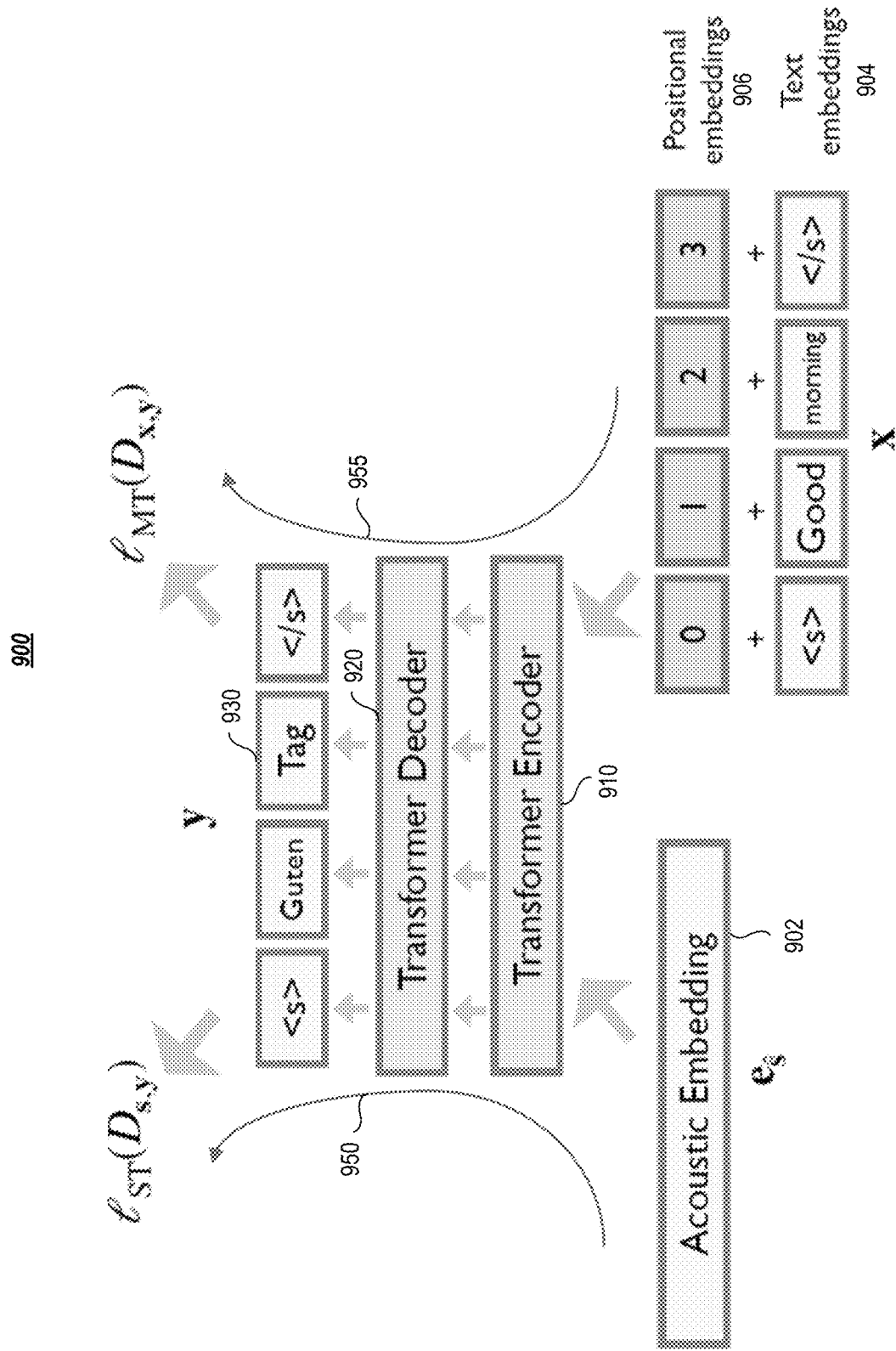
FIG. 9 graphically depicts a fused acoustic and text speech translation (FAT-ST) model, according to embodiments of the present disclosure.

In one or more embodiments, to boost the performance of end-to-end speech translation, speech translation is enabled to encode both acoustic and text features as input by simply adapting the architecture of monolingual FAT-MLM to a fused acoustic and text speech translation (FAT-ST) model. FIG. 9 graphically depicts a FAT-ST model, according to embodiments of the present disclosure. The FAT-ST model comprises a transformer encoder 910 and a transformer decoder 920. The transformer encoder 910 encodes at least an acoustic embeddings 902 corresponding to a speech audio in a source language into a representation 912, which is then processed by the transformer decoder 920 to predict a sequence of translation transcription 930 in a target language different from the source language. In one or more embodiments, the acoustic embeddings 902 may be masked acoustic embeddings when the FAT-ST model is running in a training procedure or original acoustic embeddings without any masks when the FAT-ST model is deployed for inference. The representation 912 may be an acoustic representation when the transformer encoder receives only acoustic embeddings 902, or a unified representation when the transformer encoder receives both the acoustic embeddings 902 and the text embeddings 904. In one or more embodiments, positional embeddings 906 may be used to align the text embeddings 904 for transcription alignment.

In one or more embodiments, a FAT-ST transformer encoder may have a similar or identical architecture with the transformer encoder of a monolingual FAT-MLM. In this way, a FAT-ST transformer encoder may encode acoustic features, text features, or both features. The FAT-ST model may be optimized or trained using one or more losses comprising a direct speech translation loss $\ell_{ST}$, a machine translation loss $\ell_{MT}$, and a FAT-ML loss $\ell_{FAT\text{-}MT}$.

Figure 10:
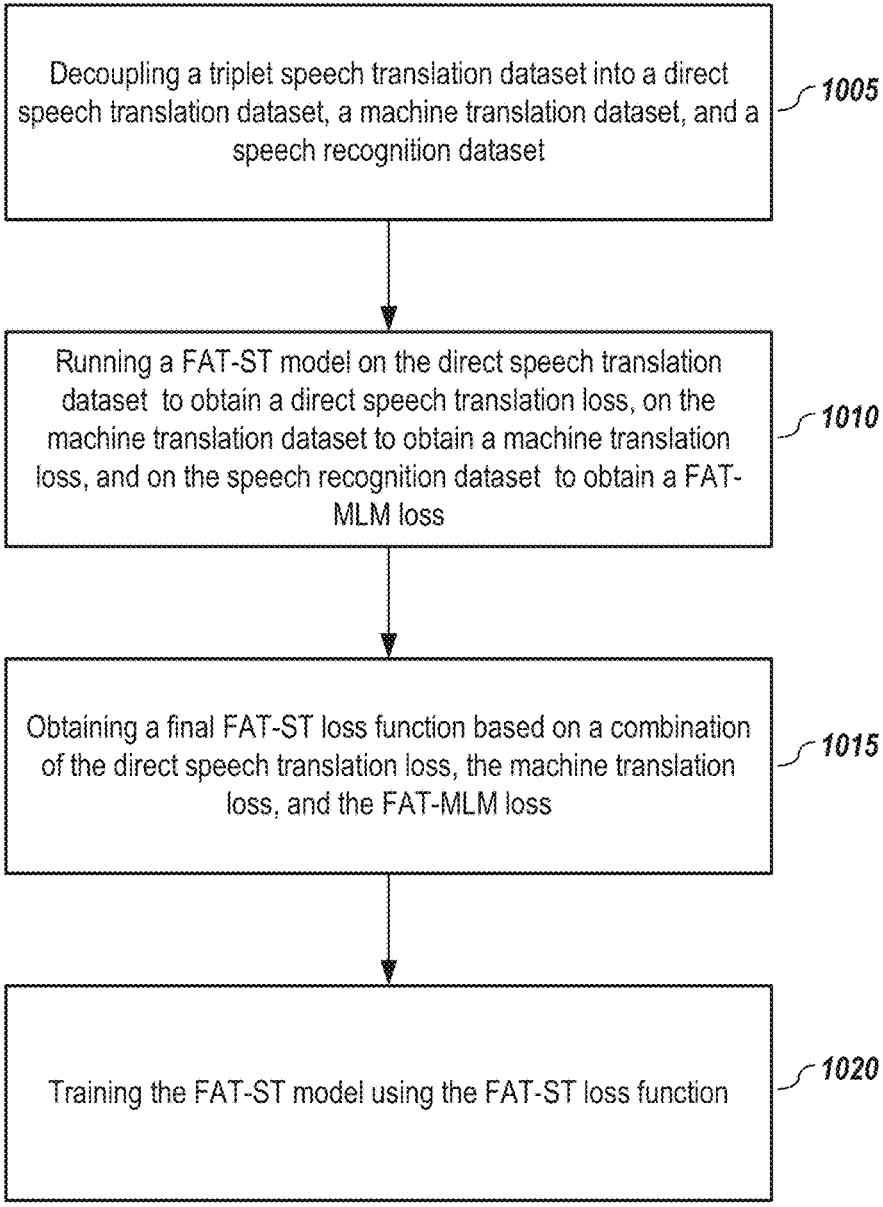
FIG. 10 depicts a process for training a FAT-ST model comprising a multimodal encoder and a decoder, according to embodiments of the present disclosure.

FIG. 10 depicts a process for training a FAT-ST model comprising a multimodal encoder and a decoder, according to embodiments of the present disclosure. Given a triplet speech translation dataset $D_{s,x,y}$ comprising speech acoustic embeddings for a speech audio, a sequence of tokens in a source language for a transcription of the speech audio, a sequence of tokens in a target language for a transcription translation of the transcription, the triplet speech translation dataset is decoupled (1005) into a direct speech translation dataset $D_{s,y}$, a machine translation dataset $D_{x,y}$ and a speech recognition dataset $D_{s,x}$. The FAT-ST model is run (1010) respectively on the direct speech translation dataset $D_{s,y}$ to obtain a direct speech translation loss $\ell_{ST}$, on the machine translation dataset $D_{x,y}$ to obtain a machine translation loss $\ell_{MT}$, and on the speech recognition dataset $D_{s,x}$ to obtain a FAT-MLM loss $\ell_{FAT\text{-}MLM}$, which is a multimodal loss comprising $\ell_s(D_{s,x})$ and $\ell_x(D_{s,x})$, as shown in Equation (5). When running on the direct speech translation dataset, the multimodal encoder encodes acoustic embeddings generated from the sequence of acoustic features into an acoustic representation and the decoder outputs a predicted sequence of tokens in the target language based on the acoustic representation, as shown on path 950 in FIG. 9. When running on the machine translation dataset, the multimodal encoder encodes a masked version of the sequence of tokens for the transcription into a text representation and the decoder outputs a predicted sequence of tokens in the target language based on the text representation, as shown on path 955 in FIG. 9. When running on the speech recognition dataset, the multimodal encoder encodes the masked version of the sequence of tokens for the transcription and the acoustic embedding into a unified representation, the unified representation is used for generating a reconstructed sequence of acoustic features and one or more reconstructed tokens for masked tokens, as similarly shown in FIG. 3A.

A final FAT-ST loss function may then be obtained (1015) based on a combination of the direct speech translation loss, the machine translation loss, and the FAT-MLM loss $\ell_{FAT\text{-}MT}$. In one or more embodiments, the FAT-ST loss function may be a sum of the three losses, shown as:

$$\ell_{FAT\text{-}ST}(D_{s,y} \cup D_{s,x} \cup D_{x,y}) = \ell_{ST}(D_{s,y}) + \ell_{MT}(D_{x,y}) + \ell_{FAT\text{-}MLM}(D_{s,x}) \quad (16)$$

One or more model parameters of the FAT-ST model may be optimized or updated (1020) using the FAT-ST loss function.

Although FIG. 10 shows a process of FAT-ST training using a triplet speech translation dataset, the FAT-ST training may also be implemented using a standalone direct speech translation dataset, a standalone machine translation dataset, a standalone speech recognition dataset, or any combination thereof. The FAT-ST loss function shown in Equation (16) may still be applicable for any of the standalone training. For example, when a FAT-ST model is trained using a standalone machine translation dataset, the FAT-ST loss function would be actually the $\ell_{MT}(D_{x,y})$ since the other two losses $\ell_{ST}(D_{s,y})$ and $\ell_{FAT\text{-}MLM}(D_{s,x})$ would essentially be zero.

It shall be noted that the speech recognition and machine translation data may either be included in speech translation data or additional datasets. Meanwhile, it is found a connectionist temporal classification (CTC) loss may be useful to improve the translation quality and thus included in one or more embodiments of the present disclosure.

3. Embodiments of Fine-Tuning FAT-ST from Translation FAT-MLM

In one or more embodiments, a FAT-ST model may be further improved by fine-tuning from FAT-MLM. Since the FAT-ST transformer decoder predicts text only, it may be initialized from the acoustic and text shared multimodal transformer encoder. For example, parameters of the FAT-ST transformer decoder may be initialized from parameters of the transformer encoder and then be optimized during a training process. Although the transformer decoder is unidirectional which is different from bidirectional FAT-MLM, it may still benefit from FAT-MLM in experiments.

E. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

Various speech translation experiments are conducted in three directions: English to German (En→De), English to Spanish (En→Es), and English to Dutch (En→Nl) to show the translation quality of baselines and embodiments of the present disclosure.

1. Datasets

Various corpora with different modalities and languages are used, including speech translation data $D_{s,x,y}$, speech recognition data $D_{s,x}$, machine translation and monolingual text data $D_{x,y}$, $D_x$, $D_y$, speech only data $D_s$, and a separate monolingual text data (only for Nl). The statistical results of the dataset are shown in Table 1. Embodiments of the presented methods are evaluated on speech translation data collected based on spontaneous speeches, which are very different from other audiobook speech datasets used in experiments. Spontaneous speeches are much harder for speech translation than audiobook datasets. That is one of the reasons why the translation accuracy of end-to-end speech translation is much worse than cascaded systems on spontaneous speeches than other speech translation corpus.

TABLE 1

Statistics of all datasets used in experiments. A parallel corpus is used for En, De, Es monolingual text; monolingual text data are used for Nl text. #Sent means the number of sentences (a) Bilingual Datasets

| Type | Name | En → De Hours | En → De #Sent | En → Es Hours | En → Es #Sent | En → Nl Hours | En → Nl #Sent |
|---|---|---|---|---|---|---|---|
| $D_{s,x,y}$ | speech translation data | 408 | 226K | 504 | 262K | 442 | 245K |
| $D_{x,y}$ | parallel corpus machine translation | — | 1.9M | — | 2.0M | — | 2.0M |

(b) Monolingual Datasets

| Type | Name | En → De Hours | En → De #Sent | De #Sent | Es #Sent | Nl #Sent |
|---|---|---|---|---|---|---|
| $D_{s,x}$ | speech recognition data | 960 | 281K | — | — | — |
| $D_s$ | speech only data | 3,748 | 579K | — | — | — |
| $D_x/D_y$ | parallel corpus/monolingual Nl text | — | 2.3M | 2.1M | 2.0M | 2.3M |

2. Some Training Details

In one or more experiments, raw audio files are used to extract multi-dimensional log-Mel filter banks stacked with 3-dimensional pitch features using a window size of 25 ms and step size of 10 ms. Text tokenizer/de-tokenizer models with a joint vocabulary size of 8K for text are trained in each dataset. Training samples that have more than 3,000 frames have been ignored for GPU efficiency. A basic transformer-based end-to-end FAT-ST framework has settings of first down-sampling the speech input with 2 layers of 2D convolution of size 3 with stride size of 2, followed by a standard 12-layer transformer with feed-forward layers of 2,048 hidden size to bridge the source and target side. Four attention heads are used on each side of the transformer and each of them has a dimensionality of 256. This section also shows the results of a FAT-ST big model with 4,096 hidden size for feed-forward layers of all transformer layers. For the speech reconstruction module, the outputs of the transformer encoder are simply linearly projected to another latent space, then the latent representations are upsampled with 2-layer deconvolution to match the size of the original input signal. The random masking ratio A is chosen as 30% across all the experiments including pre-training. During inference, there is no masking over the speech input. The last 5 checkpoints are averaged for testing. For decoding, a beam search is used with beam-size 5 and length penalty 0.6 for German, 0.0 for Spanish, and 0.3 for Dutch.

3. Translation Quality Comparisons

In this subsection, translation accuracies of FAT-ST embodiments are compared to the baselines in Table 2 and Table 3.

ST: this is the vanilla speech translation system, which does not use transcriptions.

ST+ASR MTL: ST model with an additional ASR decoder and is trained with ASR multi-task learning using the transcriptions.

ST+ASR & MT MTL: ST model with an additional ASR decoder and an MT encoder. It is trained with ASR and MT multi-task learning.

ST+MAM: ST trained with additional MAM loss which is formalized as $\ell_s(D_s)$ (shown in FIG. 2C).

ST+MAM+ASR MTL: ST trained with MAM loss and ASR multi-task learning.

E2E-ST+MME: An end-to-end ST system with a multi-modal encoder.

E2E-ST+ASR: The state-of-the-art end-to-end ST model with an extra ASR decoder.

Cascade: cascaded model which first transcribes the speech into transcription then passes the results to a machine translation system.

ST+ASR & MT pre-training: the encoder of ST is initialized by a pre-trained ASR encoder and decoder initialized by a pre-trained MT decoder.

Pseudo-translation: a prior art method to leverage additional speech data by generating pseudo-translations using a cascaded or an end-to-end speech translation model.

TABLE 2

BLEU score comparisons on speech translation test set between disclosed method embodiments and other baselines over 3 translation directions using $D_{s,x,y}$ only (including pre-training methods).

| Pre-training Methods | Models | En → De | En → Es | En → Nl | Avg. | Model Size |
|---|---|---|---|---|---|---|
| No Pre-training | ST | 19.64 | 23.68 | 23.01 | 22.11 | 31.25M |
| | ST + ASR | 21.70 | 26.83 | 25.44 | 24.66 (+2.55) | 44.82M |
| | ST + ASR & MT | 21.58 | 26.37 | 26.17 | 24.71 (+2.60) | 56.81M |
| | ST + MAM | 20.78 | 25.34 | 24.46 | 23.53 (+1.42) | 33.15M |
| | ST + MAM + ASR | 22.41 | 26.89 | 26.49 | 25.26 (+3.15) | 46.72M |
| | E2E ST + MME | 22.55 | — | — | | |
| | E2E ST + ASR | 23.63 | 28.12 | 27.55 | 26.43 (+4.32) | 51.20M |
| | Cascade § | 23.65 | 28.68 | 27.91 | 26.75 (+4.64) | 83.79M |
| | FAT-ST (base). | 22.70 | 27.86 | 27.03 | 25.86 (+3.75) | 39.34M |
| ASR & MT | ST | 21.95 | 26.83 | 26.03 | 24.94 (+2.83) | 31.25M |
| | ST + ASR & MT | 22.05 | 26.95 | 26.15 | 25.05 (+2.94) | 56.81M |

TABLE 2-continued

BLEU score comparisons on speech translation test set between disclosed method embodiments and other baselines over 3 translation directions using $D_{s,x,y}$ only (including pre-training methods).

| Pre-training Methods | Models | En → De | En → Es | En → Nl | Avg. | Model Size |
|---|---|---|---|---|---|---|
| MAM | FAT-ST (base) | 22.29 | 27.21 | 26.26 | 25.25 (+3.14) | 39.34M |
| FAT-MLM | FAT-ST (base) | 23.68 | 28.61 | 27.84 | 26.71 (+4.60) | 39.34M |
|  | FAT-ST (big) | 23.64 | 29.00 | 27.64 | 26.76 (+4.65) | 58.25M |

§ is a prior art implementation.

TABLE 3

BLEU score comparisons on speech translation data test set between FAT-ST embodiments using additional data. $D_{s,x}$: speech recognition data, $D_{x,y}$: parallel corpus MT, $D_s$: speech only data, $D_x$, $D_y$: monolingual data from parallel corpus or Wiki Text. § is a prior art implementation. Pseudo-translation uses extra $D'_{s,y}$ which includes speech recognition data ($D_{s,x}$) and 35,217-hour version of speech only data (almost 10× of $D_s$ used for FAT-ST embodiments) paired with their corresponding pseudo-translations generated by ASR and MT models. The model size for pseudo-translation is 435.0M.

| Pre-training Data | Pre-training Method | Training Data | Models | En → De | En → Es | En → Nl | Avg. |
|---|---|---|---|---|---|---|---|
| ∅ |  | $D_{s,x,y}$ | ST | 19.64 | 23.68 | 23.01 | 22.11 |
|  |  |  | Cascade § | 23.65 | 28.68 | 27.91 | 26.75 (+4.64) |
| $D_{s,x,y} \cup D_{s,x} \cup D_{x,y}$ | ASR-MT |  | ST | 22.20 | 27.16 | 26.15 | 25.17 (+3.06) |
|  |  |  | ST+ASR & MT | 22.73 | 27.99 | 27.12 | 25.95 (+3.84) |
|  | FAT-MLM |  | FAT-ST (base) | 23.98 | 28.95 | 28.08 | 27.00 (+4.89) |
|  |  |  | FAT-ST (big) | 24.34 | 29.41 | 28.86 | 27.54 (+5.43) |
| $D_{s,x,y} \cup D_{s,x} \cup D_{x,y} \cup D_s \cup D_x \cup D_y$ | FAT-MLM |  | FAT-ST (base) | 24.02 | 29.25 | 28.28 | 27.18 (+5.07) |
|  |  |  | FAT-ST (big) | 24.58 | 30.10 | 29.36 | 28.01 (+5.90) |
| $D_{s,x,y} \cup D_{s,x} \cup D_{x,y} \cup D_s \cup D_x \cup D_y$ | FAT-MLM | $D_{s,x,y}$ | FAT-ST (base) | 23.91 | 29.01 | 28.18 | 27.03 (+4.92) |
|  |  | $D_{s,x} \cup D_{x,y}$ | FAT-ST (big) | 25.47 | 30.75 | 30.08 | 28.77 (+6.66) |
| ∅ |  | $D_{s,x,y} + D'_{s,y}$ | Pseudo-translation | 25.2 | — | — | — | a) Model Size of Pre-Training Models

Table 4 shows the number of parameters of different pre-training models. It can be seen that the FAT-MLM base model is a little bit larger than the MAM pre-training model, and the FAT-MLM big model is much larger than the base model.

TABLE 4

Model sizes of different models

| Model | # of Parameters |
|---|---|
| MAM | 23.69M |
| FAT-MLM (base) | 25.76M |
| FAT-MLM (big) | 38.36M | b) Training with $D_{s,x,y}$

In Table 2, with no pre-training, it can be seen that the FAT-ST base model achieves the best results except E2E ST+ASR and the cascaded model. However, the FAT-ST base model has many fewer parameters than both of them. Models with ASR or MT MTL and E2E ST+MME all use the transcription data in the speech translation dataset but show worse performance, thus the FAT-ST model uses transcription data more efficiently. Similar to other open source ST implementation results on the speech translation dataset, the implementation of ST+ASR & MT MTL is worse than ST+ASR.

Figure 11:
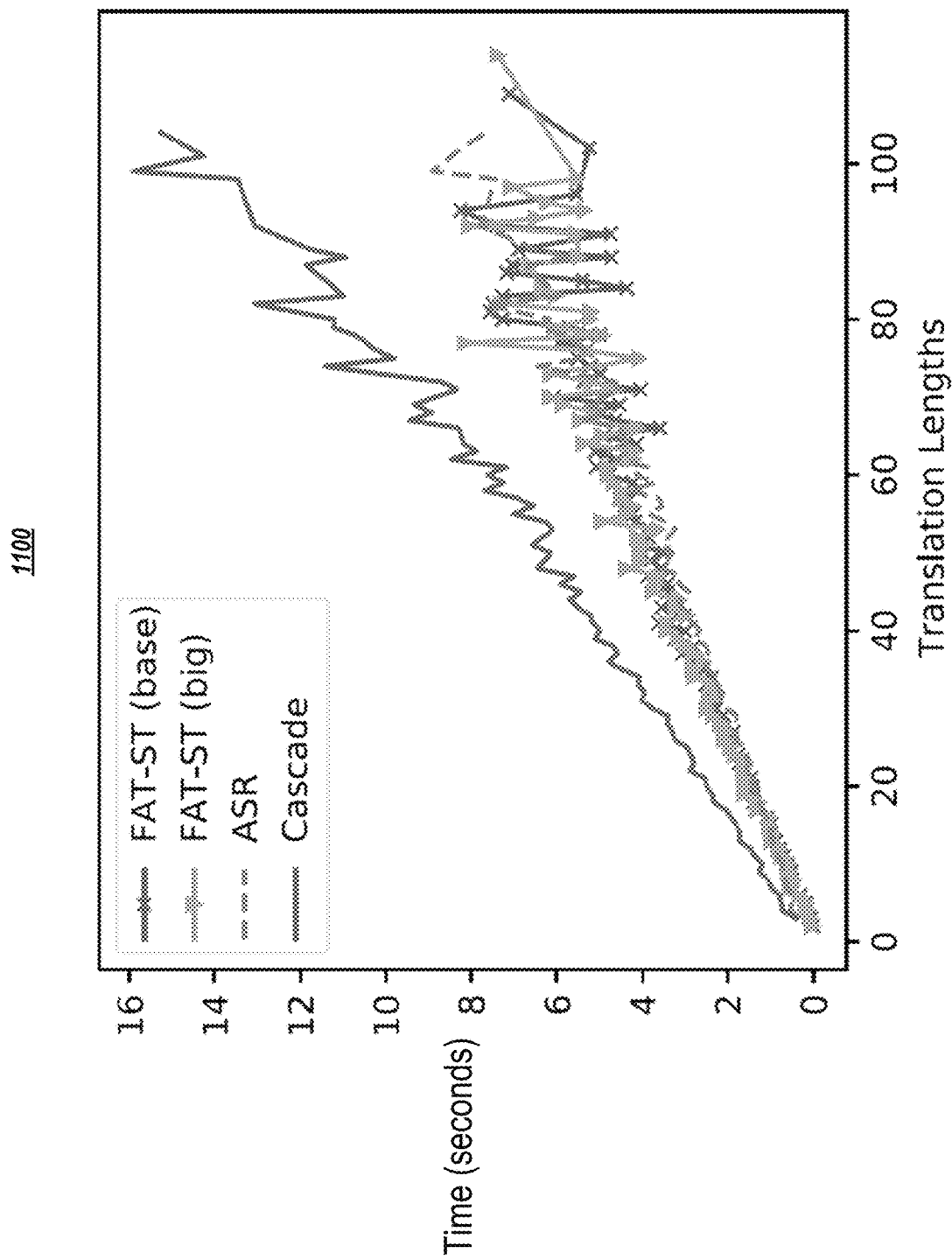
FIG. 11 graphically depicts a decoding time comparison among a cascaded model and FAT-ST models, according to embodiments of the present disclosure.

The performance of models pre-trained from different pre-training models was also compared. Upon pre-training on speech translation dataset, FAT-ST (base) is improved by 0.85 BLEU score with fine-tuning from FAT-MLM, while its performance drops by fine-tuning from MAM. Meanwhile, the presented method embodiments achieve much better performance compared with ASR & MT pre-training baselines. It shall be noted that the FAT-ST base model for the first time achieves similar performances compared with Cascade baselines in these three translation directions of speech translation, while comparing with the cascaded model, the FAT-ST base model is much smaller in size and faster in inference, as shown in FIG. 11.

c) Pre-Training with Additional Data

Table 3 shows that FAT-MLM can further improve FAT-ST by simply adding speech recognition data $D_{s,x}$ (speech recognition data) text machine translation data $D_{x,y}$ (parallel corpus) and even speech only data $D_s$ (speech only data) and monolingual text data $D_x \cup D_y$. This shows good representation learning ability of FAT-MLM. It can be seen that using larger data, the performance of the FAT-ST (big) model is increased much faster than the base model. That's because the number of parameters of the base model is too limited to learn from such big data.

d) Fine-Tuning with Additional Data

The last part of Table 2 shows that FAT-ST may be improved by learning from extra speech recognition and machine translation data. This is promising because speech translation data is very limited compared with much more abundant speech recognition and machine translation data. Different from previous efforts of leveraging additional speech data by generating pseudo-translations, FAT-ST does not use any pseudo-labels. The best FAT-ST model outperforms previous efforts on En→De by using much 7× smaller model size and almost 10× smaller speech data.

e) Performance of Auxiliary MT Task

Table 5 shows the translation quality of the auxiliary MT task of FAT-ST. Although FAT-ST models trained with speech translation dataset are worse than the MT baseline, by using FAT-MLM trained with more data, FAT-ST methods may easily outperform the MT baseline. It shall be noted that these models' parameters are tuned to optimize speech translation task and MT is just an auxiliary task.

TABLE 5

Comparisons of the auxiliary MT task between MT baselines and FAT-ST methods. § is a prior art implementation.

| Training Data | Pre-training Data | Models | →De | →Es | →Nl |
|---|---|---|---|---|---|
| $D_{s,x,y}$ | No pre-training | MT | 27.63 | 32.61 | 32.08 |
| | | FAT-ST (base) | 24.41 | 30.81 | 29.18 |
| | $D_{s,x,y}$ | FAT-ST (base) | 27.24 | 31.98 | 31.27 |
| | | FAT-ST (big) | 26.92 | 32.29 | 31.48 |
| | $D_{s,x,y} \cup D_{s,x} \cup D_{x,y}$ | FAT-ST (base) | 27.43 | 32.38 | 32.44 |
| | | FAT-ST (big) | 27.60 | 32.95 | 32.37 |
| | $D_{s,x,y} \cup D_{s,x} \cup D_{x,y}$ | FAT-ST (base) | 27.63 | 32.75 | 32.52 |
| | $\cup D_s \cup D_x \cup D_y$ | FAT-ST (big) | 28.13 | 33.39 | 32.72 |
| $D_{s,x,y} \cup D_{s,x} \cup D_{x,y}$ | $\cup D_{s,x,y} \cup D_{s,x} \cup D_{x,y}$ | FAT-ST (base) | 27.89 | 32.96 | 32.43 |
| $D_{x,y}$ | $\cup D_s \cup D_x \cup D_y$ | FAT-ST (big) | 28.80 | 34.28 | 34.22 | f) Ablation Study

Table 6 shows an ablation study of FAT-ST method embodiments. It can be seen that all the components contribute to the final performance.

TABLE 6

Ablation study. Here, hierarchical transformer means the model only shares the 6 layers of the transformer encoder for acoustic feature input and text feature input.

| Model | En→De |
|---|---|
| FAT-ST with FAT-MLM (base) | 23.68 |
| FAT-MLM decoder initialization | 23.20 |
| FAT-MLM encoder initialization | 22.70 |
| CTC loss | 22.30 |
| Hierarchical Transformer | 22.07 |
| FAT-MLM loss | 20.64 |
| MT loss | 19.64 | g) English→Chinese Speech Translation

Several models in English→Chinese speech translation task are compared with ~525 hours of speech in a training set, 1.5 hours in a validation set, and 2.5 hours in a test set. Experiment data are preprocessed following previous experiments. Performances of the models are evaluated with character-level BLEU scores. Table 7 shows one example in this dataset. The translation of the cascaded model is wrong because of the errors in its ASR (e.g., their→there, of who→to do), while FAT-ST produces the right translation. Table 8 shows that embodiments of FAT-ST largely outperform other baselines.

TABLE 7

English-to-Chinese speech translation example.

| Speech transcription | those are their expectations of who you are not yours |
|---|---|
| Target reference | 那 是 他们 所期望的 你的 样子而不是 你自己的 期望 that is they expected your appearance not yourself expectation |
| Cascade-ASR | those are there expectations to do you are not yours |
| Cascade-Translation | 那些 都是希望 做到的, 你 不是 你的。 those are expect achievement you not yours |
| FAT-ST | 这些 是 他们对你的 期望, 而不是 你的 期望。 these are they to your expectation not your expectation |

The cascaded system is an implementation using spontaneous speech training data. The errors of the cascaded model are highlighted in bold font.

TABLE 8

BLEU score comparisons on English-to-Chinese speech translation.

| Models | En→Zh |
|---|---|
| Knowledge Distillation (KD) | 19.55 |
| Listen-Understand-Translate (LUT) | 20.84 |
| COnSecutive Transcription and Translation (COSTT) | 21.12 |
| Cascade | 21.36 |
| ST* | 22.07 |
| FAT-ST | 23.73 |
| FAT-MLM + FAT-ST | 25.49 |

*is an implementation embodiment of the present disclosure.
The cascaded model is a prior art implementation.

h) Decoder Speed

FIG. 11 shows decoding speed comparisons between the Cascade model and FAT-ST model embodiments. FAT-ST model is almost 2× faster than the Cascade model which needs to wait for the speech recognition module to finish before starting to translate. The decoding time of FAT-ST (big) is almost the same as FAT-ST (base) because the feedforward network in transformers is increased only.

F. Some Observations

In the present disclosure, embodiments of a fused acoustic and text masked language model (FAT-MLM) are disclosed to learn a unified representation for text and speech from any data that combines speech and text. FAT-MLM may be further extended to a sequence-to-sequence speech translation model which enables learning from speech recognition and text-based machine translation data at the first time. Experimental results show FAT-MLM embodiments have significant improvements on three translation directions and outperform the cascaded baseline.

G. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 12:
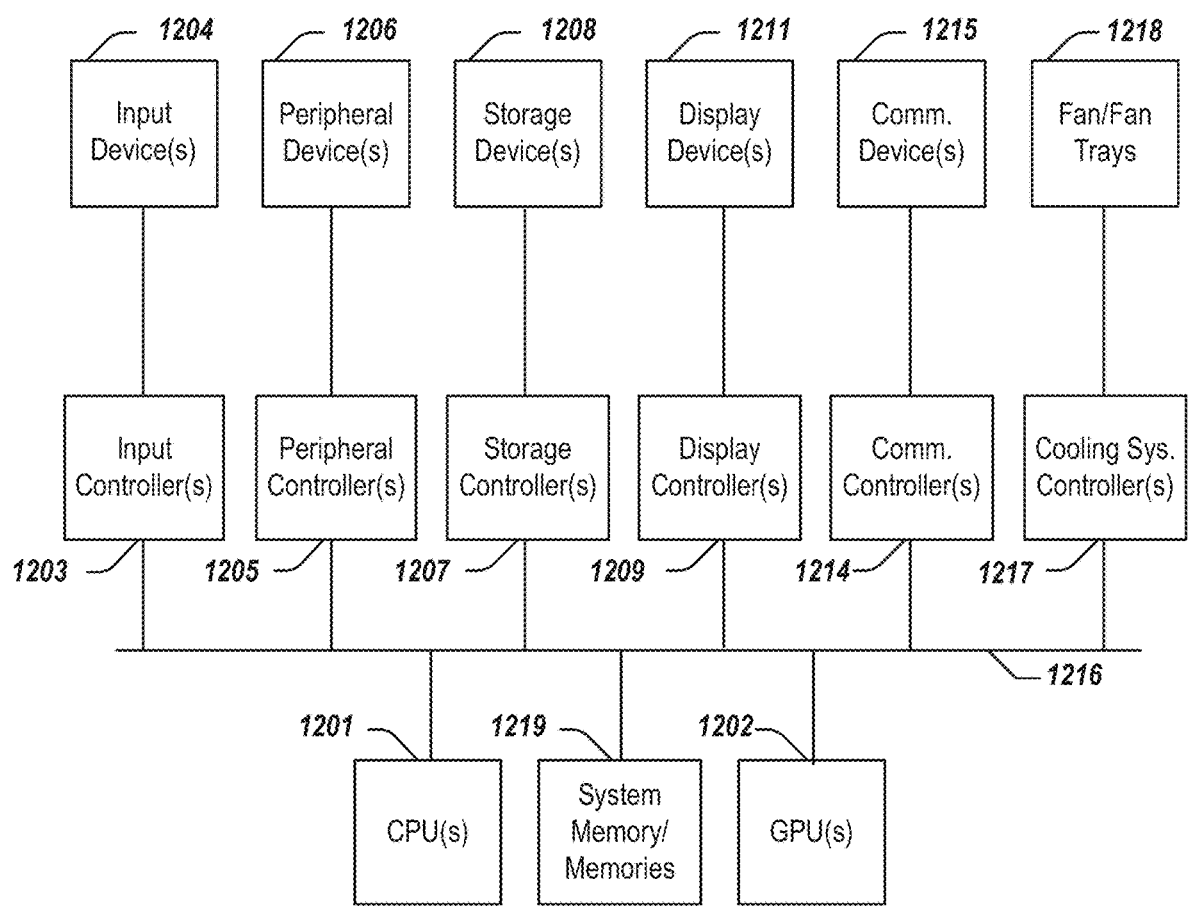
FIG. 12 depicts a simplified block diagram of a computing device/information handling system, according to embodiments of the present disclosure.

FIG. 12 depicts a simplified block diagram of an information handling system (or computing system), according to embodiments of the present disclosure. It will be understood that the functionalities shown for system 1200 may operate to support various embodiments of a computing system—although it shall be understood that a computing system may be differently configured and include different components, including having fewer or more components as depicted in FIG. 12.

As illustrated in FIG. 12, the computing system 1200 includes one or more CPUs 1201 that provide computing resources and control the computer. CPU 1201 may be implemented with a microprocessor or the like, and may also include one or more graphics processing units (GPU) 1202 and/or a floating-point coprocessor for mathematical computations. In one or more embodiments, one or more GPUs 1202 may be incorporated within the display controller 1209, such as part of a graphics card or cards. The system 1200 may also include a system memory 1219, which may comprise RAM, ROM, or both.

A number of controllers and peripheral devices may also be provided, as shown in FIG. 12. An input controller 1203 represents an interface to various input device(s) 1204. The computing system 1200 may also include a storage controller 1207 for interfacing with one or more storage devices 1208 each of which includes a storage medium such as magnetic tape or disk, or an optical medium that might be used to record programs of instructions for operating systems, utilities, and applications, which may include embodiments of programs that implement various aspects of the present disclosure. Storage device(s) 1208 may also be used to store processed data or data to be processed in accordance with the disclosure. The system 1200 may also include a display controller 1209 for providing an interface to a display device 1211, which may be a cathode ray tube (CRT) display, a thin film transistor (TFT) display, organic light-emitting diode, electroluminescent panel, plasma panel, or any other type of display. The computing system 1200 may also include one or more peripheral controllers or interfaces 1205 for one or more peripherals 1206. Examples of peripherals may include one or more printers, scanners, input devices, output devices, sensors, and the like. A communications controller 1214 may interface with one or more communication devices 1215, which enables the system 1200 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1200 comprises one or more fans or fan trays 1218 and a cooling subsystem controller or controllers 1217 that monitors thermal temperature(s) of the system 1200 (or components thereof) and operates the fans/fan trays 1218 to help regulate the temperature.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training a neural network model, the method comprising:
    masking one or more acoustic features in a sequence of acoustic features of a speech audio to obtain a masked sequence of acoustic features;
    encoding the masked sequence of acoustic features into a sequence of acoustic embeddings;
    masking one or more tokens in a sequence of tokens for a transcription of the speech audio to obtain a masked sequence of tokens;
    encoding, using a multimodal transformer encoder in the model, the masked sequence of acoustic features and the masked sequence of tokens into a unified latent representation for both acoustic and text input;
    generating a reconstructed sequence of acoustic features based on the unified latent representation;
    generating one or more reconstructed tokens corresponding to the one or more masked tokens based on the unified latent representation; and
    training, the multimodal transformer encoder using an overall loss comprising a speech reconstruction loss and a text reconstruction loss.

2. The computer-implemented method of claim 1 wherein the neural network model is a model for end-to-end speech translation.

3. The computer-implemented method of claim 1 wherein the one or more acoustic features in the sequence of acoustic features are randomly masked using a random acoustic feature masking function, the one or more tokens in the sequence of tokens are randomly masked using a random token masking function.

4. The computer-implemented method of claim 1 wherein the masked sequence of acoustic features and the masked sequence of tokens are concatenated together for encoding.

5. The computer-implemented method of claim 1 wherein the speech reconstruction loss is based on a mean squared error between the sequence of acoustic features and the sequence of reconstructed sequence of acoustic features.

6. The computer-implemented method of claim 1 wherein the text reconstruction loss is a cross-entropy loss based on the one or more reconstructed tokens.

7. The computer-implemented method of claim 1 wherein the sequence of acoustic features is a spectrogram or mel-spectrogram of the speech audio, each acoustic feature is a frame-level speech feature.

8. A computer-implemented method for training a speech translation model, the method comprising:
    incorporating a sequence of acoustic embeddings with source language embeddings to form source language incorporated acoustic embeddings, the sequence of acoustic embeddings is corresponding to a speech audio;
    incorporating a masked sequence of source language tokens with source language embeddings to form a sequence of source language incorporated tokens, the sequence of source language tokens is obtained by masking one or more tokens in a sequence of tokens corresponding to a transcription of the speech audio in a source language;
    incorporating a masked sequence of target language tokens with target language embeddings to form a sequence of target language incorporated tokens, the sequence of target language tokens is obtained by masking one or more tokens in a sequence of tokens corresponding to a translation transcription in a target language for the transcription in the source language;
    concatenating the source language incorporated acoustic embeddings, the sequence of source language incorporated tokens, and the sequence of target language incorporated tokens to form concatenated embeddings;
    encoding, by a multimodal transformer encoder in the speech translation model, the concatenated embeddings into a unified representation for speech, source language texts, and target language texts;
    reconstructing, based on the unified representation, a reconstructed sequence of acoustic features, one or more reconstructed source tokens, one or more reconstructed target tokens; and
    training the speech translation model using one or more losses selected from a speech reconstruction loss based on the reconstructed sequence of acoustic features, a source text reconstruction loss based on the one or more reconstructed source tokens, and a target text reconstruction loss based on the one or more reconstructed target tokens.

9. The computer-implemented method of claim 8 wherein the sequence of acoustic embeddings is obtained by encoding a sequence of masked acoustic features corresponding to the speech audio, the sequence of masked acoustic features is generated by randomly masking one or more acoustic features in a sequence of acoustic features for the speech audio.

10. The computer-implemented method of claim 8 wherein the speech translation model is trained using a summation of the speech reconstruction loss, the source text reconstruction loss, and the target text reconstruction loss.

11. The computer-implemented method of claim 8 wherein the speech reconstruction loss is based on a mean squared error between the sequence of acoustic features and the sequence of reconstructed sequence of acoustic features.

12. The computer-implemented method of claim 8 wherein the source text reconstruction loss and the target text reconstruction loss are cross-entropy losses.

13. The computer-implemented method of claim 8 further comprising:
using positional embeddings to align the masked sequence of source language tokens and the masked sequence of target language tokens for cross-lingual alignment.

14. A computer-implemented method for training a speech translation model, the method comprising:
decoupling a triplet speech translation dataset into a direct speech translation dataset, a machine translation dataset, and a speech recognition dataset, the triplet speech translation dataset comprises a sequence of acoustic features corresponding to a speech audio, a sequence of tokens for a transcription in a source language for the speech audio, and a sequence of tokens for a translation transcription for the speech audio in a target language;
running the speech translation model on the direct speech translation dataset to obtain a direct speech translation loss, the speech translation model comprises a multimodal encoder and a decoder, when running on the direct speech translation dataset, the multimodal encoder encodes acoustic embeddings generated from the sequence of acoustic features into an acoustic representation, the decoder outputs a predicted sequence of tokens in the target language based on the acoustic representation;
running the speech translation model on the machine translation dataset to obtain a machine translation loss, when running on the machine translation dataset, the multimodal encoder encodes a masked version of a sequence of tokens for the transcription into a text representation, the decoder outputs a predicted sequence of tokens in the target language based on the text representation;
running the speech translation model on the speech recognition dataset to obtain a multimodal loss for both acoustic and text, when running on the speech recognition dataset, the multimodal encoder encodes the masked version of the sequence of tokens for the transcription into and the acoustic embedding into a unified representation, the unified representation is used for generating a reconstructed sequence of acoustic features and one or more reconstructed tokens for masked tokens;
obtaining a final loss function based on a combination of the direct speech translation loss, the machine translation loss, and the multimodal loss; and
training the speech translation model using final loss.

15. The computer-implemented method of claim 14 wherein the final loss function is a sum of the direct speech translation loss, the machine translation loss, and the multimodal loss.

16. The computer-implemented method of claim 14 wherein the acoustic embeddings are generated from the sequence of acoustic features using steps comprising:
masking, using a random acoustic feature masking function, one or more acoustic features in the sequence of acoustic features of a speech audio, to obtain a masked sequence of acoustic features; and
encoding, using a transformer encoder, the masked sequence of acoustic features into acoustic embeddings.

17. The computer-implemented method of claim 14 wherein the multimodal loss comprises a speech reconstruction loss based on the reconstructed sequence of acoustic features and a text reconstruction loss based on the one or more reconstructed tokens.

18. The computer-implemented method of claim 17 wherein the speech reconstruction loss is a mean squared error between the sequence of acoustic features and the sequence of reconstructed sequence of acoustic features, and the text reconstruction loss is a cross-entropy loss based on the one or more reconstructed tokens.

19. The computer-implemented method of claim 14 wherein the masked version of the sequence of tokens is aligned using positional embeddings for encoding by the multimodal encoder.

20. The computer-implemented method of claim 14 wherein the decoder is initialized from the multimodal encoder.

* * * * *